US006650603B2

(12) United States Patent
Michimori et al.

(10) Patent No.: US 6,650,603 B2
(45) Date of Patent: Nov. 18, 2003

(54) DISC PLAYER AND METHOD OF CONTROLLING THE SAME

(75) Inventors: Atsushi Michimori, Tokyo (JP); Masaaki Takeshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 118 days.

(21) Appl. No.: 09/954,046

(22) Filed: Sep. 18, 2001

(65) Prior Publication Data

US 2002/0036976 A1 Mar. 28, 2002

(30) Foreign Application Priority Data

Sep. 27, 2000 (JP) .......................................... 2000-294910

(51) Int. Cl.⁷ .............................................. G11B 17/22
(52) U.S. Cl. ..................................... 369/30.82; 369/192
(58) Field of Search .......................... 369/30.82, 30.81, 369/192, 30.85

(56) References Cited

U.S. PATENT DOCUMENTS

| 6,097,693 | A | * | 8/2000 | Nakamichi ................... 369/270 |
| 6,215,757 | B1 | * | 4/2001 | Fujimoto et al. ............. 369/192 |
| 6,222,816 | B1 | * | 4/2001 | Yoshida et al. ............. 369/247 |
| 6,301,205 | B1 | * | 10/2001 | Nakamichi ............... 369/36.01 |
| 2002/0021653 | A1 | * | 2/2002 | Takeshima et al. ......... 369/191 |

FOREIGN PATENT DOCUMENTS

| DE | 19753690 A1 | * | 7/1998 | ......... G11B/17/028 |
| EP | 833324 A2 | * | 4/1998 | ........... G11B/17/22 |
| EP | 872833 A1 | * | 10/1998 | ......... G11B/17/028 |
| JP | 04149856 A | * | 5/1992 | ........... G11B/17/26 |
| JP | 07057369 A | * | 3/1995 | ........... G11B/17/26 |
| JP | 10003732 A | * | 1/1998 | ........... G11B/17/26 |
| JP | B22813174 | | 8/1998 | |
| JP | 2000195141 A | * | 7/2000 | ........... G11B/17/26 |
| JP | WO0079527 | | 12/2000 | |

* cited by examiner

Primary Examiner—William Klimowicz
(74) Attorney, Agent, or Firm—Birch, Stewart, Kolasch & Birch, LLP

(57) ABSTRACT

A disc player includes a disc holding/separating mechanism which holds the plurality of discs concentrically and which separates the selected disc from the remaining discs; a turntable; a pickup; a playback base which supports the turntable and which moves toward and away from the disc holding/separating mechanism; a clamper which secures the selected disc to the turntable; a damper arm which supports the clamper and which moves toward and away from the disc holding/separating mechanism; a translating mechanism which supports the playback base and the clamper arm and which moves toward and away from the disc holding/separating mechanism; and a control mechanism which controls motions of the playback base, the clamper arm and the translating mechanism in such a way that, when the selected disc is put on the turntable by the disc holding/separating mechanism, the turntable is placed at a first position, which is located on a central axis of the plurality of discs held by the disc holding/separating mechanism, and when the pickup reads out data from the selected disc, the turntable is placed at a second position, which is located at a predetermined distance from the first position.

10 Claims, 22 Drawing Sheets

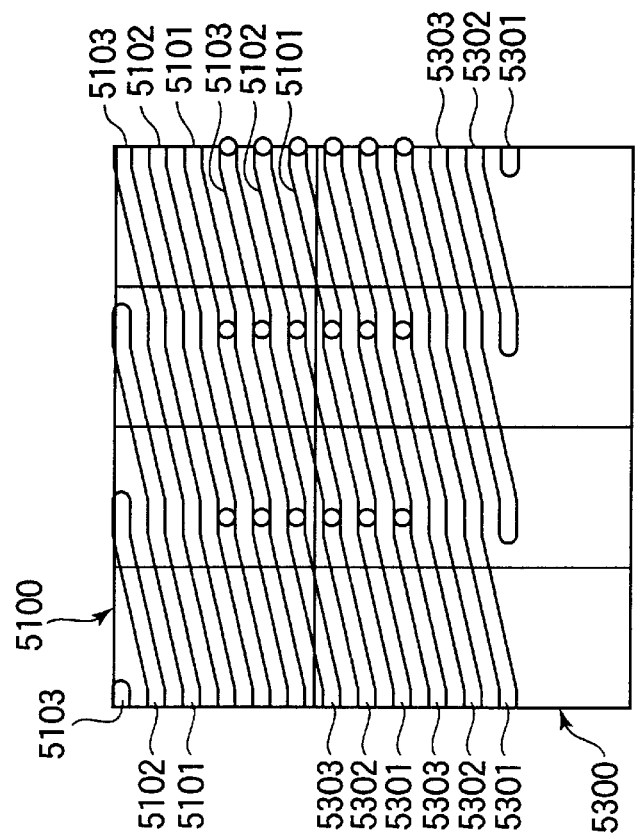
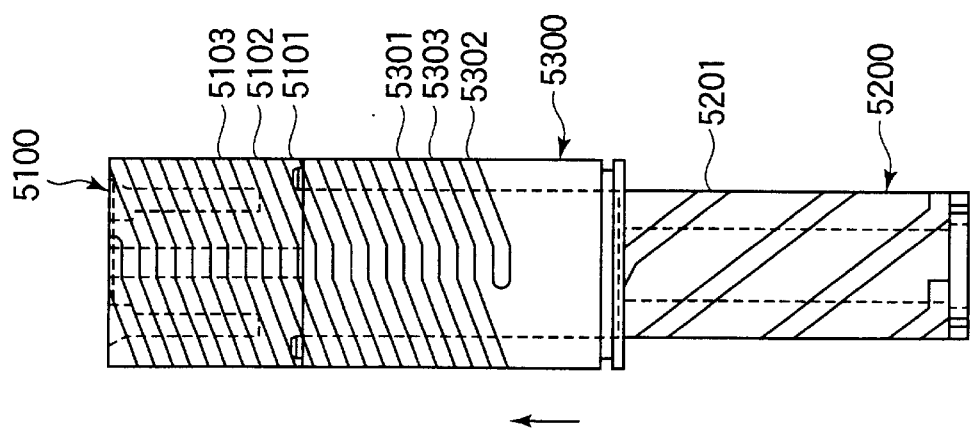

DISC PLAYER AND METHOD OF CONTROLLING THE SAME

BACKGROUND OF THE INVENTION

The present invention relates to a disc player which contains a plurality of discs and plays back a disc selected therefrom and a method of controlling the disc player.

FIGS. 21A and 21B are diagrams showing a prior art disc player disclosed in Japanese Patent Publication No. 2,813,174 published on Dec. 22, 1998. FIG. 21A shows an exploded perspective view of a disc holding/separating section 90 for holding a plurality of discs 91 and 91a, and FIG. 21B shows a side view showing a playback section 92. Referring to FIGS. 21A and 21B, when a disc 91a to be played back is selected from the plurality of discs, a tray 93a on which the selected disc 91a is placed is separated from the remaining trays 93 by a separating and positioning mechanism (not shown), thereby creating upper and lower spaces 94a and 94b above and below the selected disc 91a. A playback base 95 together with a clamper arm 98a is lifted up to an elevation corresponding to the tray 93a and rotates about an axis 95a to move the turntable 96 and an optical pickup 97 into the upper space 94a and to move a clamper 98 mounted on the clamper arm 98a into the lower space 94b. After that, the damper arm 98a swings upward about a shaft 98b in a direction Q to separate the selected disc 91a from the tray 93a and urges it against the turntable 96. Subsequently, the turntable 96 is rotated to play back the selected disc 91a.

In the above-described prior art disc player, the playback base 95 is provided with both the turntable 96 and the damper 98, which are simultaneously conveyed into the upper space 94a and the lower space 94b, respectively. Therefore, the upper space 94a and the lower space 94b must be simultaneously secured above and below the selected disc 91a. Accordingly, a thickness of the disc holding/separating section 90 is increased, which results in an increased thickness of the prior art disc player.

SUMMARY OF THE INVENTION

It is an object of the present invention to provide a disc player with a reduced thickness, and a method of controlling the disc player.

According to the present invention, a disc player which is capable of containing a plurality of discs and playing back a disc selected from the plurality of discs, comprises: a disc holding/separating mechanism which holds the plurality of discs concentrically and which separates the selected disc from the remaining discs; a turntable; a pickup which reads out data recorded on the selected disc which is placed on the turntable; a playback base which supports the turntable and which moves toward and away from the disc holding/separating mechanism; a clamper which secures the selected disc to the turntable; a clamper arm which supports the clamper and which moves toward and away from the disc holding/separating mechanism; a translating mechanism which supports the playback base and the clamper arm and which moves toward and away from the disc holding/separating mechanism; and a control mechanism which controls motions of the playback base, the damper arm and the translating mechanism in such a way that, when the selected disc is put on the turntable by the disc holding/separating mechanism, the turntable is placed at a first position, which is located on a central axis of the plurality of discs held by the disc holding/separating mechanism, and when the pickup reads out data from the selected disc, the turntable is placed at a second position, which is located at a predetermined distance from the first position.

Further, after the playback base moves toward the disc holding/separating mechanism to place the turntable at the second position to place the turntable at the second position, the translating mechanism moves toward the disc holding/separating mechanism to place the turntable at the first position.

Furthermore, the disc player may comprise a stop member which is provided on the playback base and which comes into contact with the disc holding/separating mechanism when the translating mechanism moves toward the disc holding/separating mechanism, wherein the turntable is located at the first position when the stop member comes into contact with the disc holding/separating mechanism.

Moreover, when the translating mechanism moves toward the disc holding/separating mechanism to move the turntable from the second position to the first position, the clamper arm moves away from the disc holding/separating mechanism.

Further, after the turntable is located at the first position, the clamper arm moves toward the disc holding/separating mechanism and the damper secures the selected disc to the turntable.

Furthermore, after the clamper secures the selected disc to the turntable, the translating mechanism moves away from the disc holding/separating mechanism to move the turntable from the first position to the second position.

The playback base may be rotatably mounted on the translating mechanism. Further, the clamper arm may be rotatably mounted on the translating mechanism.

According to the present invention, a method of controlling a disc player comprising the steps of: separating a disc selected from a plurality of discs which are concentrically held by a disc holding/separating mechanism; moving a playback base for supporting a turntable toward the disc holding/separating mechanism to place the turntable at a second position, which is located at a predetermined distance from a central axis of the plurality of discs held by the disc holding/separating mechanism; moving a translating mechanism toward the disc holding/separating mechanism; moving a translating mechanism toward the disc holding/separating mechanism to place the turntable at a first position, which is located on the central axis of the plurality of discs held by the disc holding/separating mechanism, the translating mechanism supporting the playback base and a damper arm together with a clamper; putting the selected disc on the turntable; moving the clamper arm toward the disc holding/separating mechanism; securing the selected disc to the turntable by the clamper; moving the translating mechanism away from the disc holding/separating mechanism to move the turntable from the first position to the second position; and playing back the selected disc at the second position.

The method may further comprises the steps of: moving the translating mechanism toward the disc holding/separating mechanism to move the turntable from the second position to the first position; raising the clamper from the selected disc which is placed on the turntable; moving the damper arm away from the disc holding/separating mechanism to move the damper to an outside of the plurality of discs held by the disc holding/separating mechanism; holding the selected disc by the disc holding/separating mechanism; moving the translating mechanism away from the disc holding/separating mechanism to move the turntable from the first position to the second position; and moving the playback base away from the disc holding/separating mechanism to move the turntable to the outside of the plurality of discs held by the disc holding/separating mechanism.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A and 5B are a side view of a first guide member to a third guide member of the disc holding/separating mechanism and an unfolded view of the first guide member and the third guide member when they are coupled to each other;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
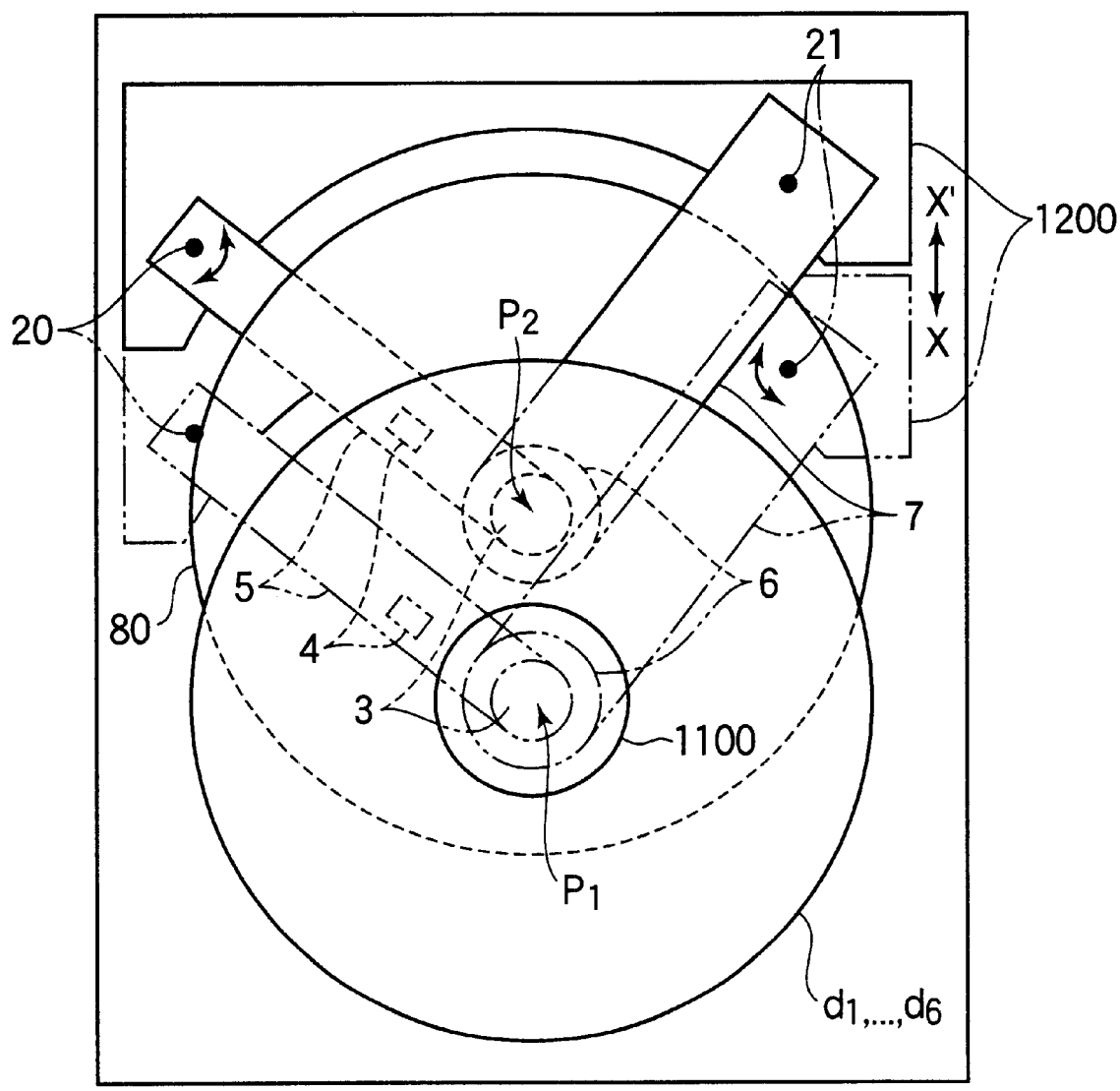
FIG. 1 is a conceptual diagram illustrating a schematic plan view of a disc player according to the embodiment of the present invention.

FIG. 1 is a conceptual diagram illustrating a schematic plan view of a disc player according to the embodiment of the present invention. In FIG. 1, two-dotted chain lines indicate a state in which the disc player places a turntable 3 at a first position P1 to separate a selected disc 80 from the remaining discs and put it on the turntable 3, while solid lines indicate a state in which the disc player places the turntable 3 at a second position $P_2$ to play back the selected disc 80.

Referring to FIG. 1, the disc player according to the embodiment comprises a disc holding/separating mechanism 1100 which is capable of holding a plurality of discs $d_1$ to $d_6$ concentrically and separating a selected disc 80 to be played back from the remaining discs. The disc player also comprises a turntable 3, a pickup 4 which reads out data recorded on the selected disc 80 which is placed on the turntable 3, and a playback base 5 which supports the turntable 3 and the optical pickup 4 and which moves toward and away from the disc holding/separating mechanism 1100 by rotating about a pole 20. The disc player further comprises a clamper 6 which secures the selected disc 80 to the turntable 3, and a clamper arm 7 which supports the clamper 6 and which moves toward and away from the disc holding/separating mechanism 1100 by rotating about a pole 21.

Referring to FIG. 1, the disc player further comprises a translating mechanism 1200 which supports the playback base 5 and the clamper arm 7 and which moves in a straight line toward and away from the disc holding/separating mechanism 1100 in a direction X or X'. The disc player further comprises a control mechanism (not shown in FIG. 1, but shown in FIG. 11) which controls motions of the playback base 5, the damper arm 7 and the translating mechanism 1200 in such a way that, when the selected disc 80 is put on the turntable 3 by the disc holding/separating mechanism 1100, the turntable 3 is placed at a first position $P_1$, which is located on a central axis of the plurality of discs $d_1$ to $d_6$ held by the disc holding/separating mechanism 1100, and when the pickup 4 reads out data from the selected disc, the turntable 3 is placed at a second position $P_2$, which is located at a predetermined distance from the first position $P_1$.

1. Disc Holding/Separating Mechanism

Figure 2:
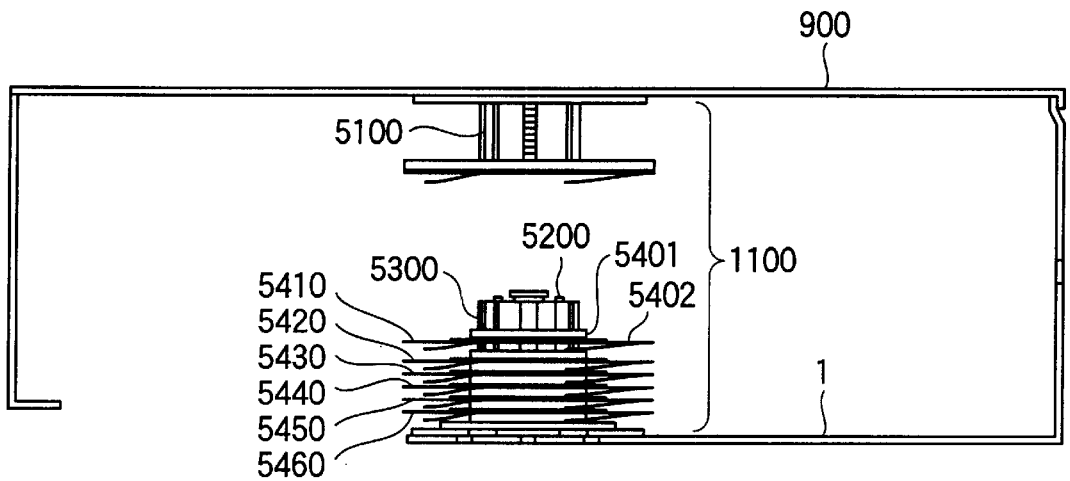
FIG. 2 is a schematic side view of a disc holding/separating mechanism of the disc player according to the embodiment when it holds no disc.
Figure 3:
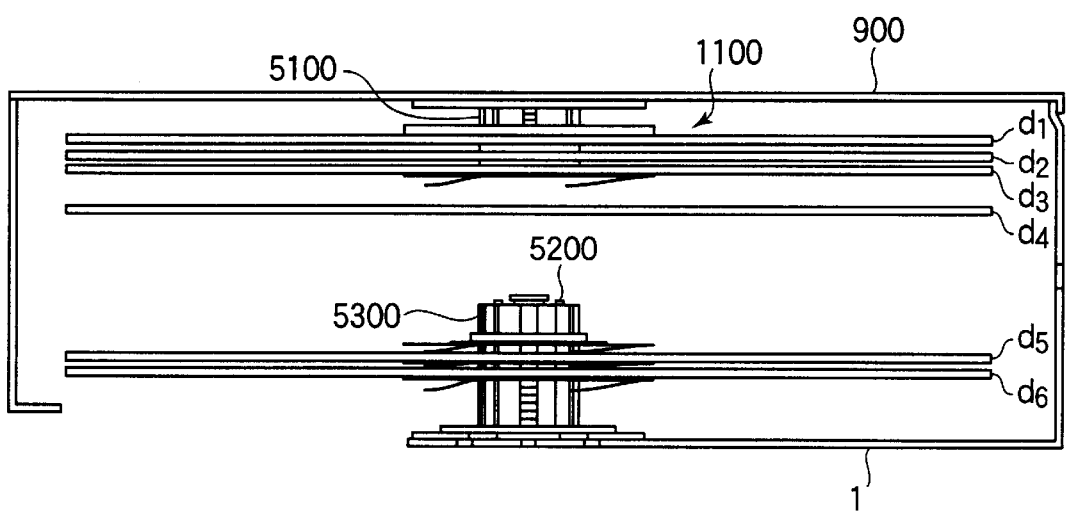
FIG. 3 is a schematic side view of a disc holding/separating mechanism of the disc player according to the embodiment when it holds a plurality of discs concentrically and separates a selected disc to be played back from the remaining discs.

FIG. 2 is a schematic side view of the disc holding/separating mechanism 1100 when it holds no disc. Further, FIG. 3 is a schematic side view of the disc holding/separating mechanism 1100 when it holds six discs $d_1$ to $d_6$ concentrically and separates a selected disc 80 (or $d_3$) from the remaining discs. The disc holding/separating mechanism 1100 is the same as that proposed in our prior International Application No. PCT/JP99/03316 (WO 00/79527 A1 published on Dec. 28, 2000).

Referring to FIG. 2, the disc holding/separating mechanism 1100 includes a cylindrical first guide member 5100 which is mounted on a top plate 900, a cylindrical second guide member 5200 which is mounted on a base plate 1, and a cylindrical third guide member 5300 which is supported by the second guide member 5200 so as to be vertically movable. The disc holding/separating mechanism 1100 also includes a first spacer to a sixth spacer 5410, 5420, 5430, 5440, 5450 and 5460, each of which can hold a disc around a center hole of the disc, and which are supported by the first guide member 5100 or the third guide member 5300 so as to be vertically movable.

Figure 4A:
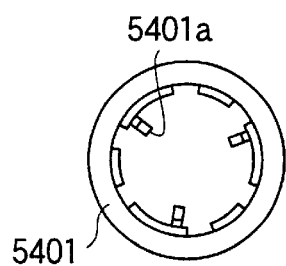
FIGS. 4A and 4B are plan views respectively showing a disc rack of the disc holding/separating mechanism, on which a disc is placed and a leaf spring member which presses down a lower disc against the lower disc rack.
Figure 4B:
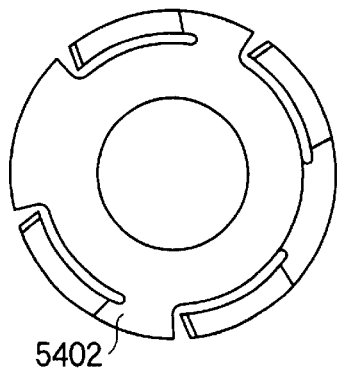

Each spacer 5410, 5420, 5430, 5440, 5450 and 5460 includes a disc rack 5401 on which a disc is placed and a leaf spring member 5402 which is connected to the lower surface of the disc rack 5401. FIGS. 4A and 4B are plan views respectively showing the disc rack 5401 and the leaf spring member 5402. The disc rack 5401 has projections 5401a which is engaged with below-described spiral grooves formed on an outer surface of the first guide member 5100 and spiral grooves formed on the third guide member 5300. The leaf spring member 5402 has a function of pressing down a lower disc against the lower disc rack.

The discs $d_1$ to $d_6$ are supported by the first spacer to the sixth spacer 5410, 5420, 5430, 5440, 5450 and 5460 while the respective guide members 5100, 5200 and 5300 pass through the center holes of the spacers. The disc holding/separating mechanism 1100 is capable of holding six discs $d_1$ to $d_6$. When a selected disc 80 is to be played back, a turntable 3 and a clamper 6 are inserted toward a space between the first guide member 5100 and the second or the third guide member 5200 or 5300.

Figure 6A:
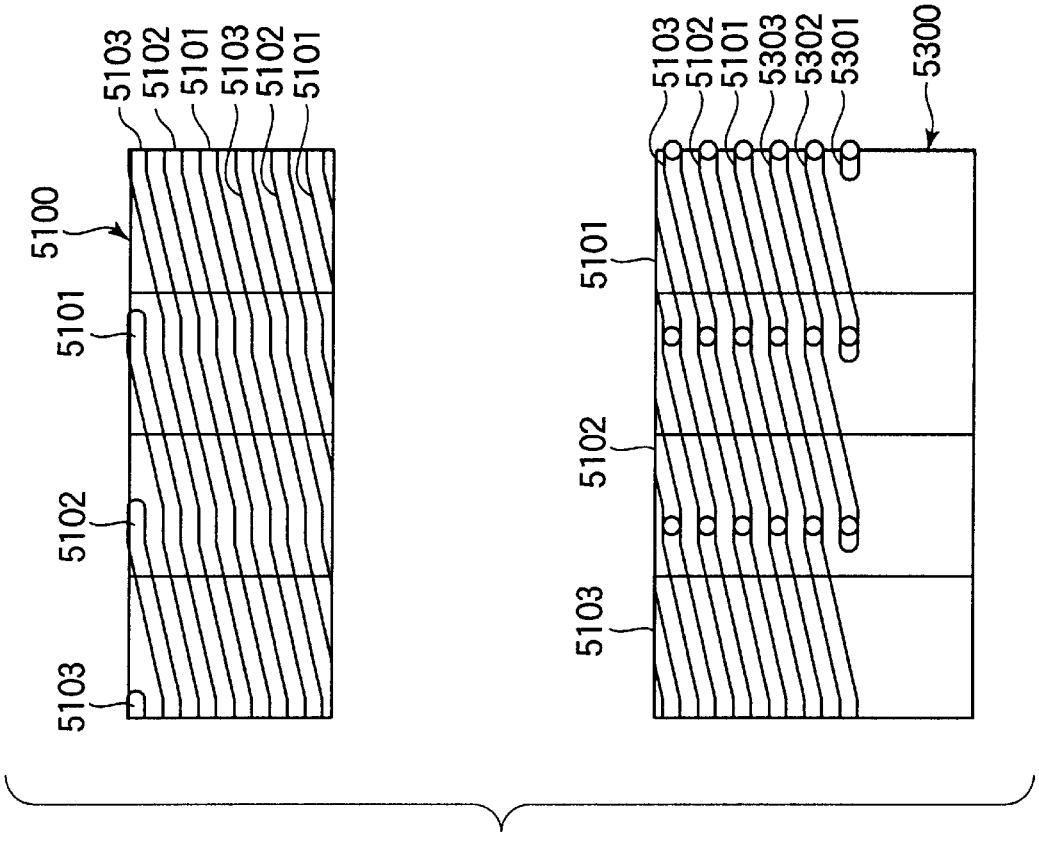
FIGS. 6A and 6B are a side view of the first guide member to the third guide member and an unfolded view of the first guide member and the third guide member when they are separated to each other.
Figure 6B:
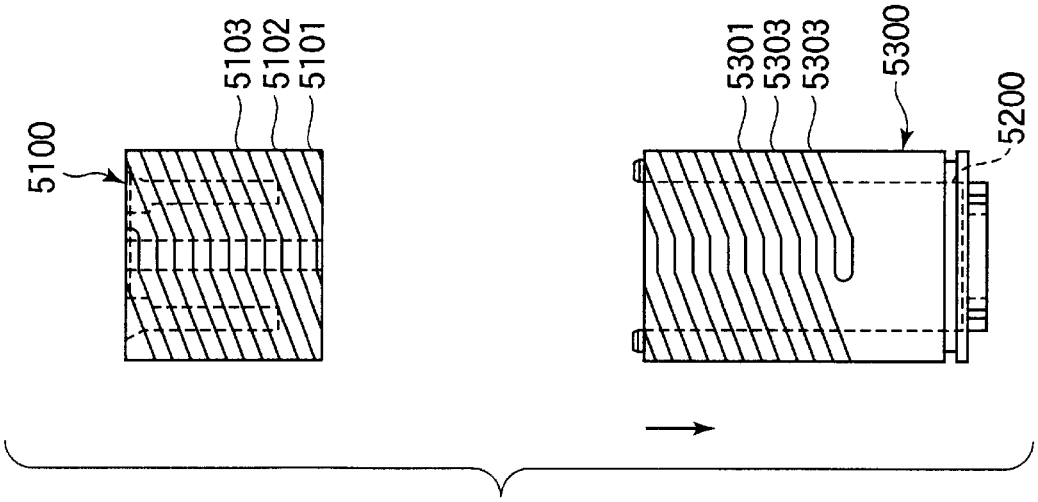
Figure 7A:
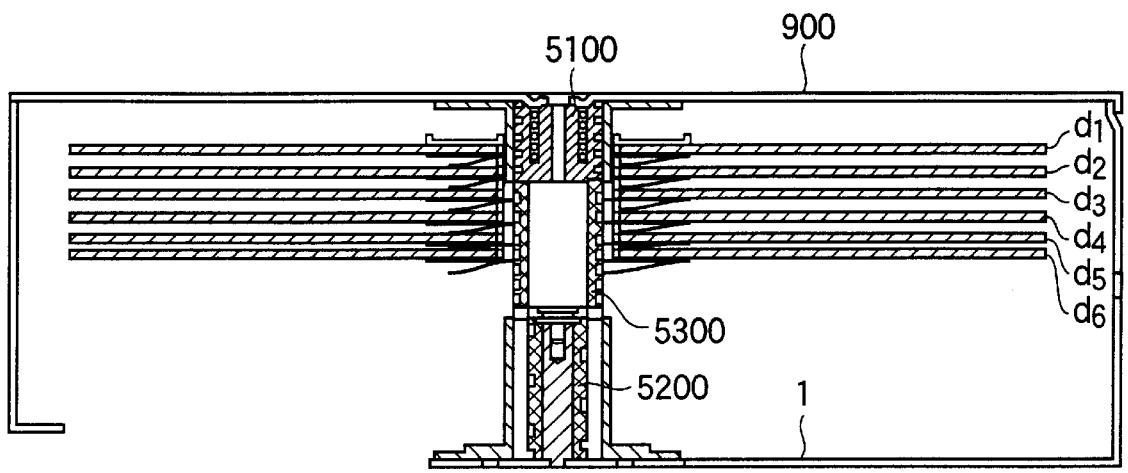
FIGS. 7A and 7B are a cross sectional view of the disc holding/separating mechanism and an unfolded view of the first guide member and the third guide member when they are coupled to each other and the discs are raised upward.
Figure 7B:
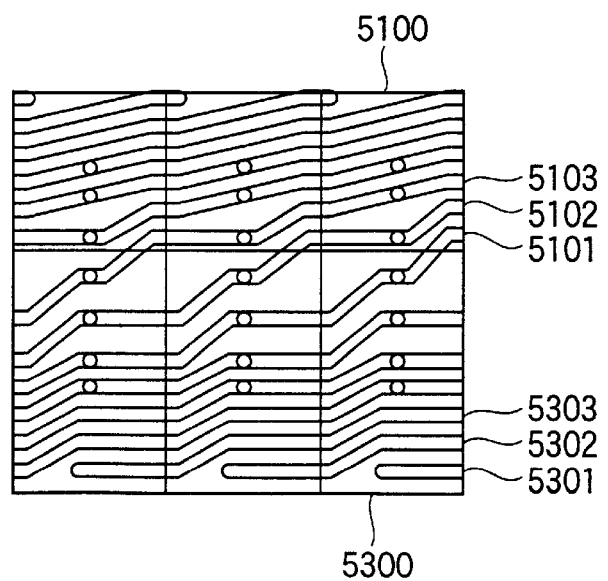
Figure 8A:
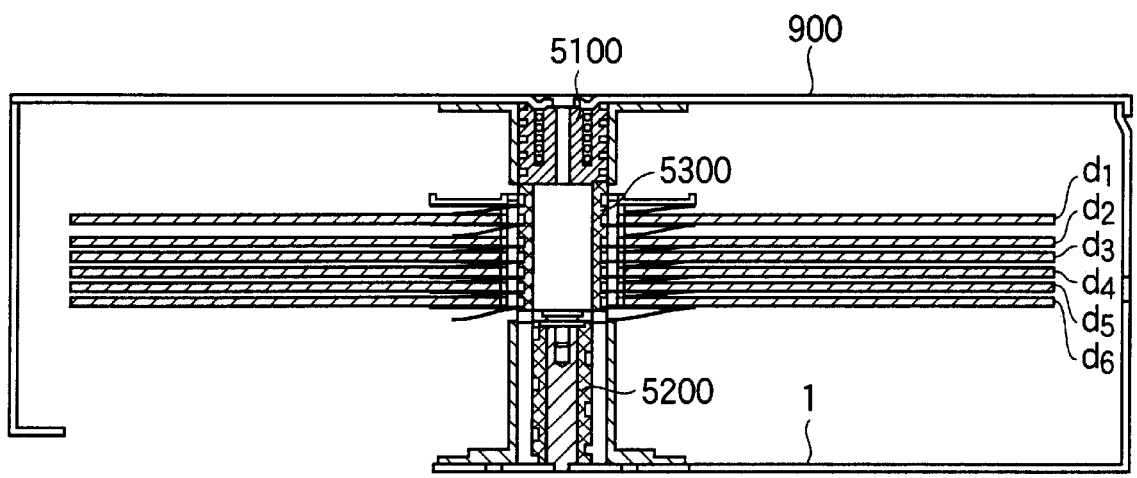
FIGS. 8A and 8B are a cross sectional view of the disc holding/separating mechanism and an unfolded view of the first guide member and the third guide member when they are coupled to each other and the discs are brought downward.
Figure 8B:
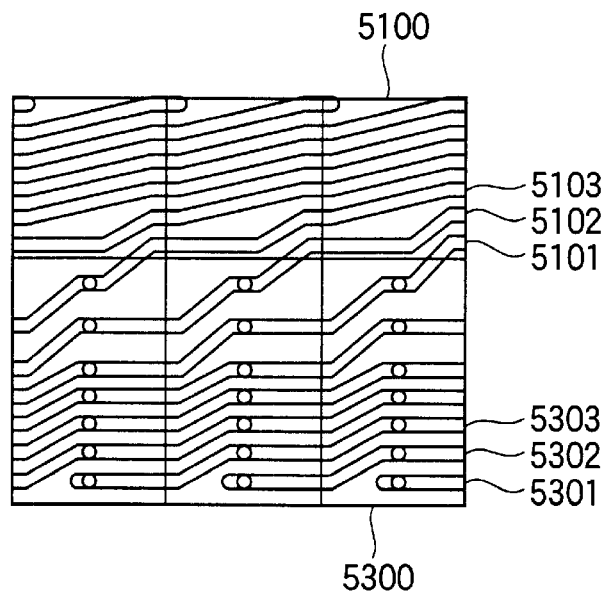
Figure 9A:
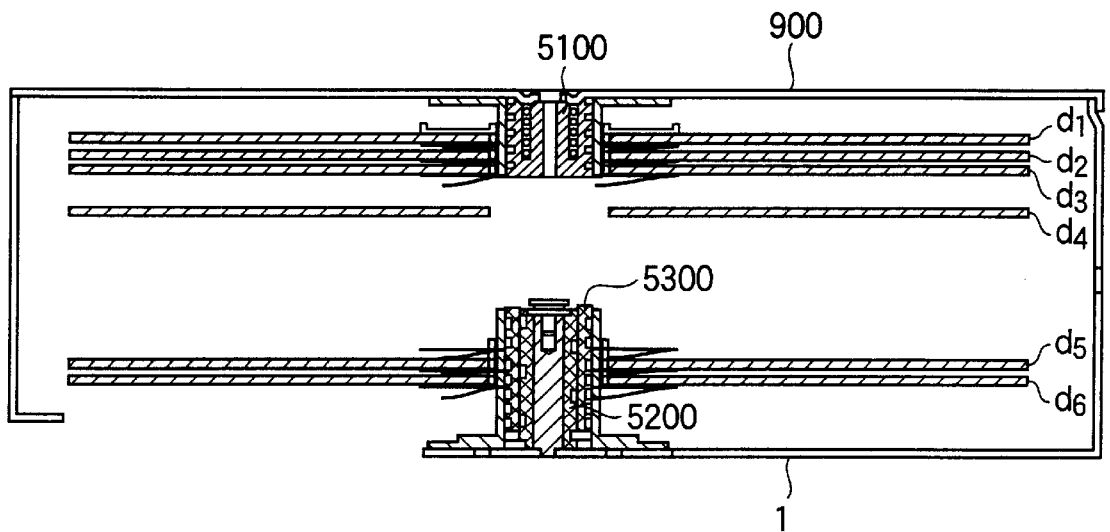
FIGS. 9A and 9B are a cross sectional view of the disc holding/separating mechanism and an unfolded view of the first guide member and the third guide member when they are separated to each other and a selected disc is separated from the remaining discs.
Figure 9B:
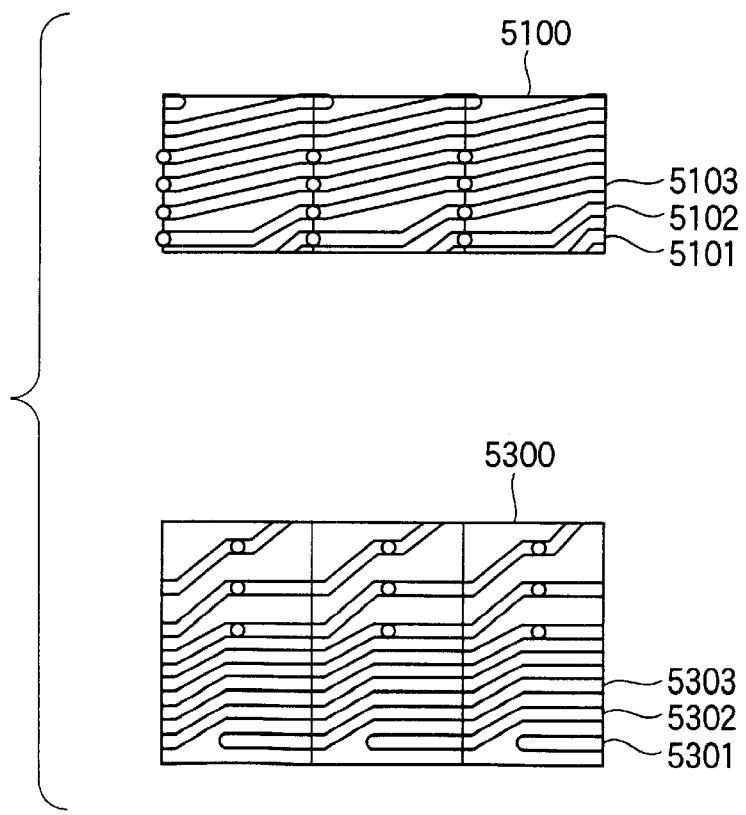

FIGS. 5A and 5B are a side view of the first guide member to the third guide member 5100, 5200 and 5300 of the disc holding/separating mechanism 1100 and an unfolded view of the first guide member 5100 and the third guide member 5300 when they are coupled to each other, FIGS. 6A and 6B are a side view of the first guide member to the third guide member 5100, 5200 and 5300 and an unfolded view of the first guide member 5100 and the third guide member 5300 when they are separated to each other. Further, FIGS. 7A and 7B are a cross sectional view of the disc holding/separating mechanism 1100 and an unfolded view of the first guide member 5100 and the third guide member 5300 when they are coupled to each other and the discs $d_1$ to $d_6$ are raised upward, and FIGS. 8A and 8B are a cross sectional view of the disc holding/separating mechanism 1100 and an unfolded view of the first guide member 5100 and the third guide member 5300 when they are coupled to each other and the discs $d_1$ to $d_6$ are brought downward. Furthermore, FIGS. 9A and 9B are a cross sectional view of the disc holding/separating mechanism 1100 and an unfolded view of the first guide member 5100 and the third guide member 5300 when they are separated to each other and a selected disc 80 is separated from the remaining discs.

As shown in FIG. 5A and FIG. 6A, spiral grooves 5201 are provided on an outer surface of the second guide member 5200. Projections (not shown) that are provided on an inner surface of the third guide member 5300 are engaged with the spiral grooves 5201 of the second guide members 5200, respectively. When the second guide member 5200 is caused to rotate about its own axis by a drive mechanism (not shown), the third guide member 5300 moves up or down along its own axis (namely, a vertical direction).

Further, as shown in FIGS. 5A and 5B and FIGS. 6A and 6B, spiral grooves 5101, 5102 and 5103 are provided on an outer surface of the first guide member 5100. Furthermore, as shown in FIGS. 5A and 5B and FIGS. 6A and 6B, spiral grooves 5301, 5302 and 5303 are provided on an outer surface of the third guide member 5300. When the third guide member 5300 is moved up and is coupled to the first guide member 5100, the spiral grooves 5101, 5102 and 5103 are connected to the spiral grooves 5301, 5302 and 5303, respectively.

The projections 5401a of the disc rack 5401 shown in FIG. 4A are engaged with the spiral grooves 5101, 5102 and 5103 or the spiral grooves 5301, 5302 and 5303, as indicated circles in FIG. 5B and FIG. 6B. Therefore, when the first guide member 5100 and the third guide member 5300 rotate about their own axis, each disc racks 5401, which are not rotated, moves up and down vertically. Further, the spiral grooves 5101, 5102, 5103 and 5301, 5302, 5303 are designed as illustrated in FIG. 7B and FIG. 8B.

The operation of the disc holding/separating mechanism 1100 will now be described. FIGS. 10A to 10H are schematic side views illustrating the playback operation of the third disc $d_3$ in the disc player according to the embodiment after the playback of the second disc $d_2$ is finished.

Figure 10A:
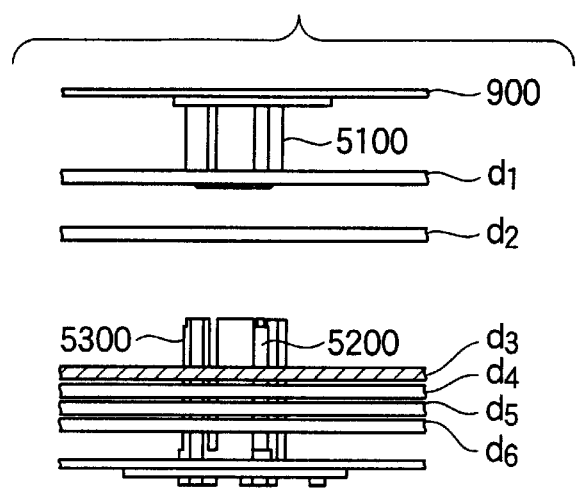
FIGS. 10A to 10H are schematic side views illustrating the operation of the disc player according to the embodiment.
Figure 10B:
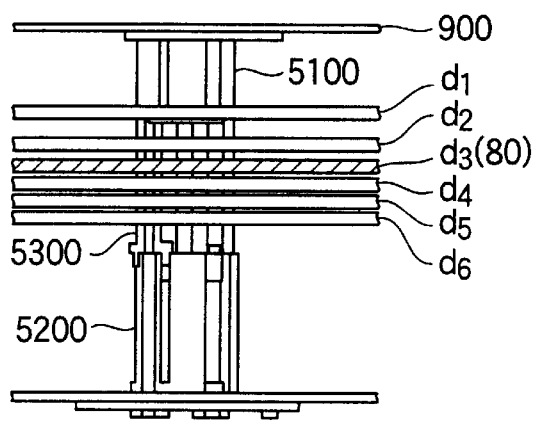
Figure 10C:
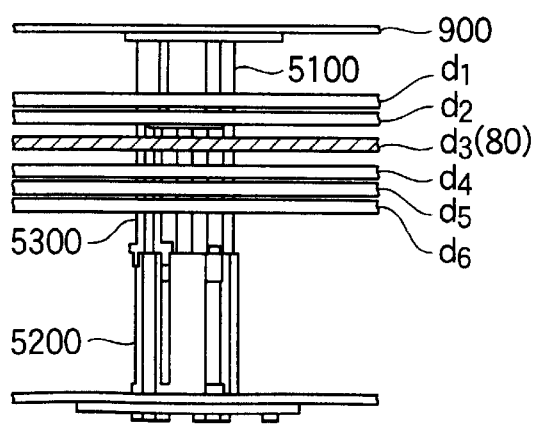
Figure 10D:
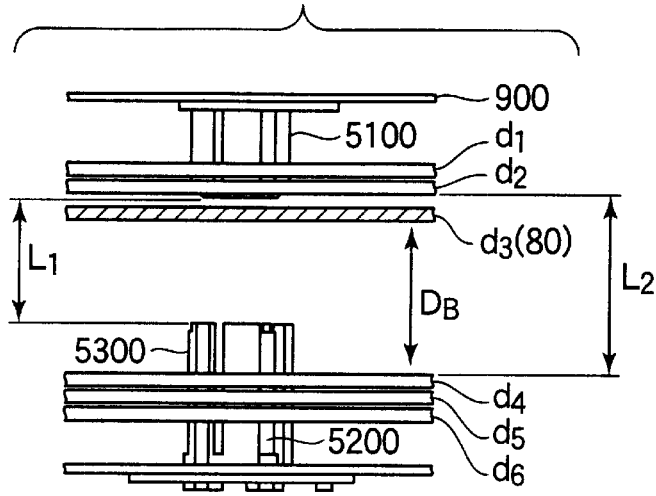

FIG. 10A illustrates that the second disc $d_2$ placed on the turntable 3 is held by holding arms (not shown in this figure but shown in FIG. 11 as parts 201) after the playback of the second disc $d_2$ has been completed. At this time, the first disc $d_1$ is held by the first guide member 5100 while the third disc $d_3$ to the sixth disc $d_6$ are held by the third guide member 5300. The third guide member 5300 which holds the third disc $d_3$ to the sixth disc $d_6$ is now moved upward to be connected to the first guide member 5100, as shown in FIG. 10B. At this time, the second disc $d_2$ is supported by the second spacer which is carried by the third guide member 5300. When the second disc $d_2$ is carried by the third guide member 5300 in the manner shown in FIG. 10B, the carrier arms (not shown in FIGS. 10A to 10H) which holds the second disc $d_2$ moves away therefrom. Subsequently, the discs $d_1$ to $d_6$ are moved upward by the first spacer 5410 to the sixth spacer 5460 shown in FIG. 1, in a manner illustrated in FIG. 10C, and the second disc $d_2$ is transferred onto the first guide member 5100. At this time, the third disc $d_3$ which is supported by the third spacer 5430 is held by the carrier arms. On the other hand, the third guide member 5300 moves downward while holding the fourth disc $d_4$ to the sixth disc $d_6$, and thus is separated from the first guide member 5100. As a result of the described operation, a space $D_B$ is created between the third disc $d_3$ and the fourth disc $d_4$, as shown in FIG. 10D.

Figure 10E:
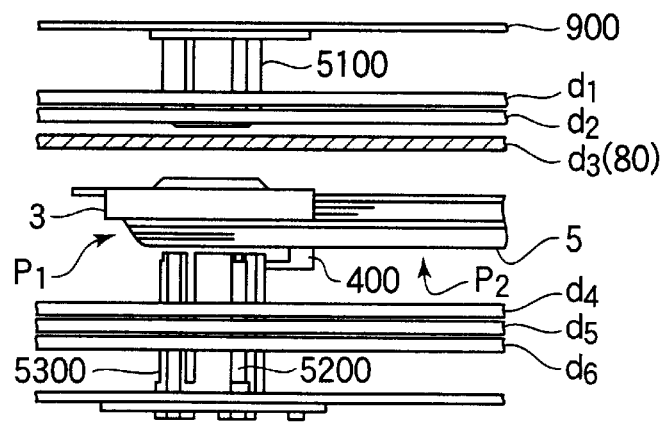

The turntable 3 is conveyed from an outside of the discs held by the disc holding/separating mechanism 1100 into the second position $P_2$, and then the translating mechanism 1200 conveys the playback base 5 to place the turntable 3 at the first position $P_1$, as shown in FIG. 10E.

As shown in FIG. 10E, a stop member 400 is provided on the playback arm 5. The stop member 400 comes into contact with the disc holding/separating mechanism 1100 when the translating mechanism 1200 moves toward the disc holding/separating mechanism 1100, and therefore the turntable 3 is precisely located at the first position $P_1$. When the translating mechanism 1200 moves toward the disc holding/separating mechanism 1100 as shown in FIG. 10E, the clamper arm 7 moves away from the disc holding/separating mechanism 1100 (not shown in FIG. 10E, but shown in below-described FIGS. 14A and 14B).

Figure 10F:
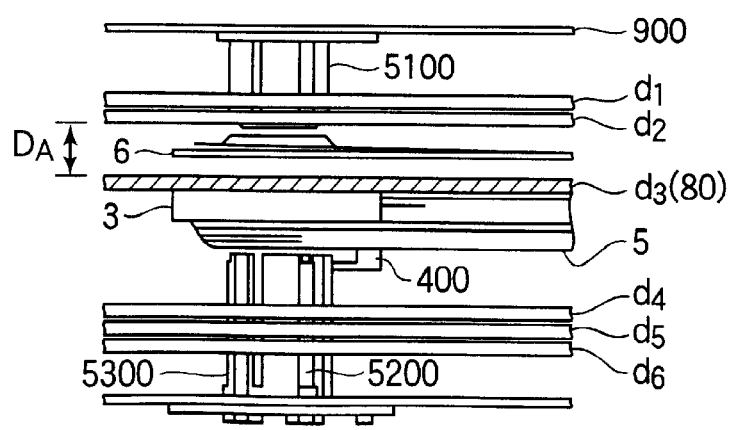
Figure 10G:
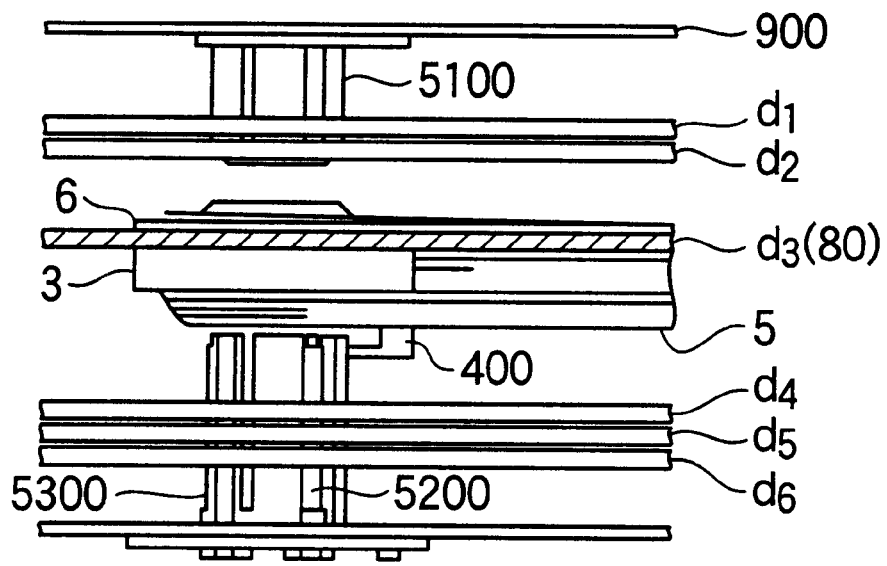

After that, the third disc $d_3$ is placed on the turntable 3, a space $D_A$ is created between the third disc $d_3$ and the second disc $d_2$ as shown in FIG. 10F. The damper arm 7 moves toward the space $D_A$ of the disc holding/separating mechanism 1100 to cause the clamper 6 to secure the selected disc 80 to the turntable 3, as shown in FIGS. 10F and 10G.

Figure 10H:
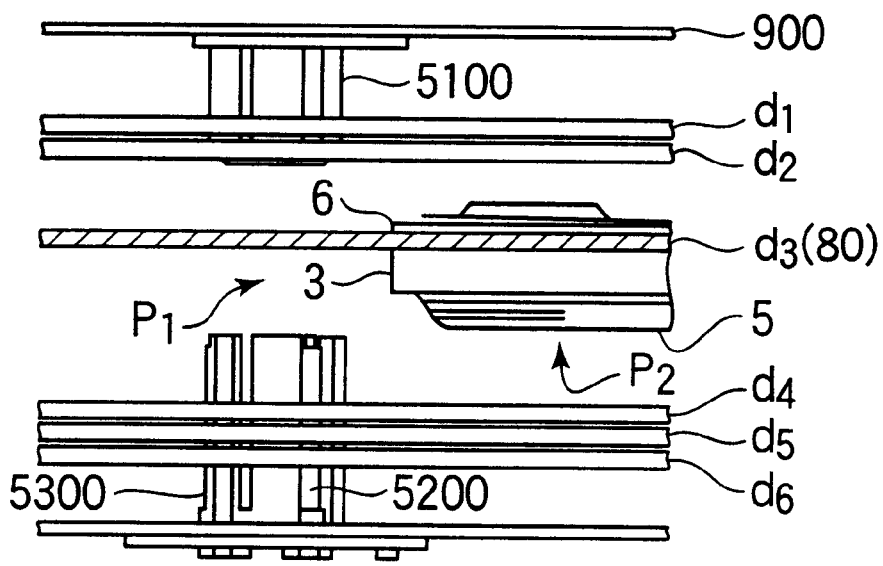

After that, the translating mechanism 1200 moves away from the disc holding/separating mechanism 1100 to move the turntable 3 from the first position $P_1$ to the second position $P_2$, as shown in FIG. 10H, and the selected disc 80 is played back.

As shown in FIG. 10D, the ends of the first guide member 5100 and the second guide member 5200 project inward through the internal diameters of the discs $d_2$ and $d_4$ which are located on the opposite sides of the selected disc $d_3$. Accordingly, a distance between the opposing ends of the first and the second guide member 5100 and 5200 (hereafter referred to as a first distance $L_1$) is less than a distance between the opposing surfaces of the discs $d_2$ and $d_4$ (hereafter referred to as a second distance $L_2$). As a consequence, when the turntable 3 and the clamper 6 are conveyed into the first position $P_1$ in order to clamp the selected disc $d_3$ and are then conveyed to the second position $P_2$ for purpose of playback, an interference of the turntable 3 and the damper 6 with the first and the second guide member 5100 and 5200 which might occur in response to external shocks can be prevented. As shown in FIG. 10E, the turntable 3 is positioned so that the rotary shaft thereof is in alignment with the center of the discs held by the disc holding/separating mechanism 1100, and thus the selected disc $d_3$ (80) can be positioned accurately. In addition, since the damper 6 is conveyed into the space which is formed when the selected disc $d_3$ is placed on the turntable 3 as shown in FIG. 10F, it is possible to reduce the first distance $L_1$ which is required in order to clamp the disc, thus allowing the vertical size of the apparatus to be reduced.

In order to clamp a disc, if both the turntable 3 and the clamper 6 are simultaneously inserted as in the conventional practice, the space $D_A$ and the space $D_B$ must be simultaneously secured above and below the selected disc which is held by the carrier arm, thus increasing the required vertical size of the apparatus.

By contrast, in the disc player according to the embodiment of the present embodiment, the turntable 3 and the clamper 6 are allowed to be conveyed to the first position $P_1$ separately. Accordingly, by inserting the clamper 6 into the space $D_A$ which is formed by placing the selected disc on the turntable 3, a space which has been secured in the prior art practice above the selected disc can be omitted, thereby allowing the required vertical size of the apparatus to be reduced.

2. Disc Playback Mechanism

Figure 11:
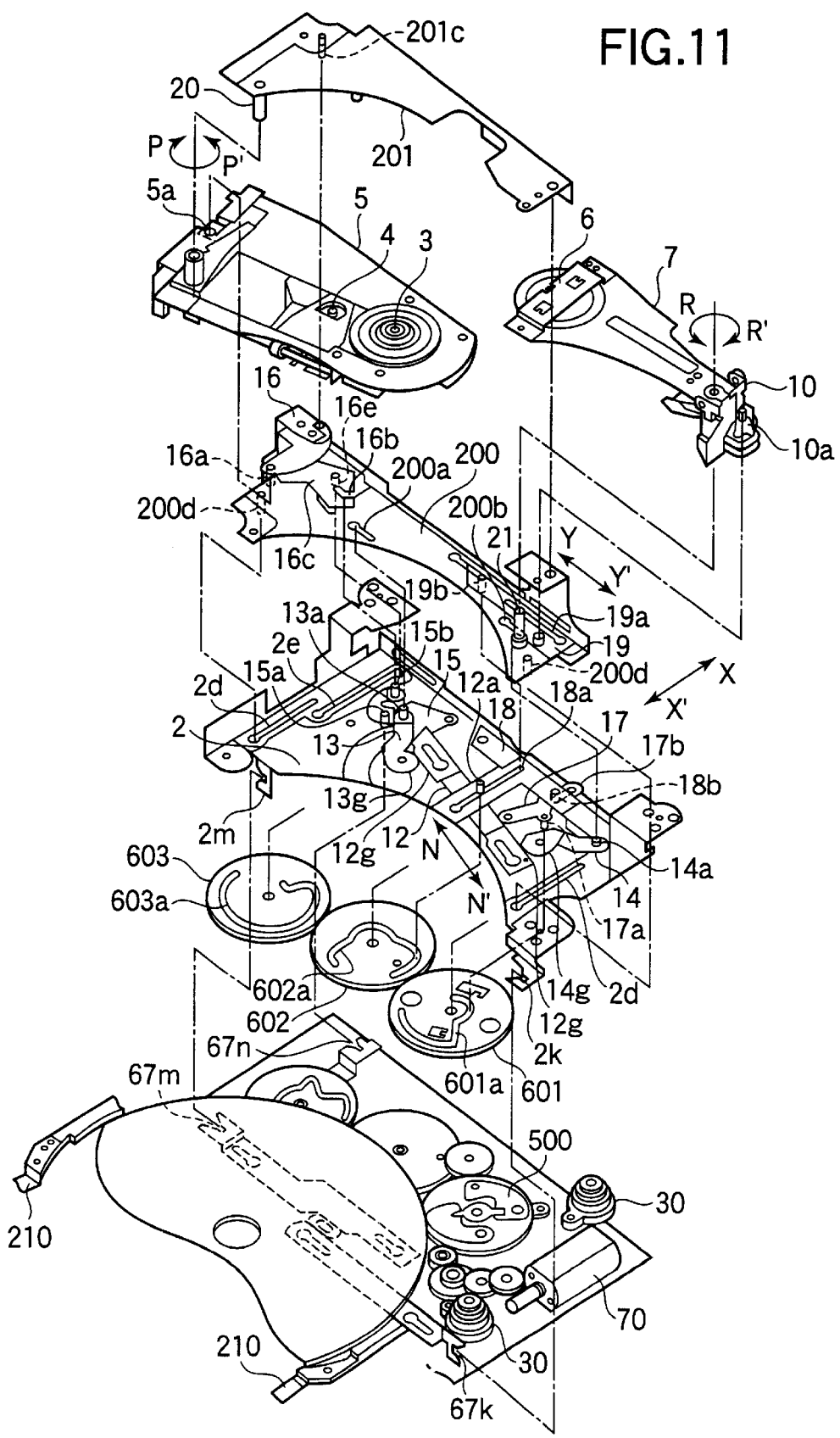
FIG. 11 is an exploded perspective view showing a playback section moving mechanism of the disc player according to the embodiment.

FIG. 11 is an exploded perspective view of a playback base moving mechanism, a translating mechanism 1200, and a clamper driving mechanism of the disc player according to the embodiment of the present invention. In FIG. 11, a reference numeral 1 denotes a base plate as a part of a main body of the disc player. The base plate 1 supports a sub-base 2 in a floating manner through vibration absorbing members (or cushioning members) 30. In FIG. 11, a drive motor 70, a clutch gear 500 having a clutch mechanism (not shown), and other drive mechanisms are disposed on the base plate 1. Detent members include three pawls 67k, 67m and 67n. The sub-base 2 is supported in a floating manner, and is provided with pawls 2k, 2m and 2n on its back surface which are engaged by the pawls 67k, 67m and 67n, respectively, to unlock the pawls 67k, 67m and 67n during the disc playback operation. Cam gears 601, 602 and 603 are pivotally mounted on the back surface of the sub-base 2 so as to be rotatable, and the clutch gear 500 includes clutch means (not shown), which transmit power to the cam gears 601 to 603 successively.

A translating plate 200 is disposed on the sub-base 2 so as to be slidable in a direction indicated by arrows X–X'. A pin 200d is fixedly mounted on the back surface of the translating plate 200 and is engaged by a guide groove 2d formed in the sub-base 2. A sub-plate 201 is fixedly connected to the translating plate 200, and is formed on its back surface with a pole 20 on which the playback base 5 having the turntable 3 mounted thereon is rotatably mounted. The translating plate 200 is also formed with a pole 21 on which the clamper arm 7 that carries the clamper 6 is rotatably mounted. Mounted on the sub-base 2 is a linkage including levers that drive the playback base 5, the translating plate 200 and the damper arm 7.

(1) Playback Base Drive Mechanism

The playback base 5 is provided with an opening 5a which engages with a first pin 16a formed on the back surface of a lever 16. A cam 16c is formed integrally on the lever 16, and a second pin 16e which engages with a groove 2e formed in the sub-base 2 is formed on the back surface of the cam 16c. A cam configuration 16b formed in the cam 16c engages with a pin 15b on a swing lever 15 which is rotatably mounted on the sub-base 2. A pin 15a which engages with a cam groove 603a of the cam gear 603 is formed on the back surface of the swing lever 15, and the above-mentioned linkage operates as the cam gear 603 turns to allow the playback base 5 to rotate in a direction indicated by arrows P–P'

(2) Translating Plate Drive Mechanism

Swing levers 13 and 14 are rotatably mounted on the sub base 2. Pins 13a and 14a that engage with openings 200a and 200b, respectively, formed in the translating plate 200 are formed on the swing levers 13 and 14, respectively. A rack plate 12 is disposed on the translating plate 200 so as to be slidable in a direction indicated by arrows N–N'. The opposite ends of the rack plate 12 are provided with gears which mesh with gears 13g and 14g, respectively, formed on the swing levers 13 and 14, respectively. A pin 12a which engages with a cam groove 602a formed in the cam gear 602 is formed on the back surface of the rack plate 12, and the above-mentioned linkage operates as the cam gear 602 rotates, allowing the translating plate 200 to translate in the direction indicated by the arrows X–X'.

(3) Clamper Drive Mechanism

A clamper arm support member 10 is rotatably mounted on the pole 21 for supporting the clamper arm 7. The clamper arm support member 10 is integrally provided with a cam that is formed with a cam groove 10a for allowing a turning motion thereof. A first drive plate 19 is disposed on the translating plate 200 so as to be slidable in a direction indicated by arrows Y–Y', and has a drive pin 19a formed thereon which engages with the cam groove 10a in the damper arm support member 10. A second drive plate 18 is disposed on the sub-base 2 so as to be slidable in the direction indicated by the arrows Y–Y'. The second drive plate 18 is provided with a guide groove 18a, which engages with a pin 19b formed on the back surface of the first drive plate 19. A swing lever 17 is rotatably mounted on the sub-base 2, and is provided with a groove 17b which engages with a pin 18b formed on the back surface of the second drive plate 18. A pin 17a which engages with a cam groove 601a formed in the cam gear 601 is formed on the back surface of the swing lever 17, and the above-mentioned linkage operates as the cam gear 601 rotates, allowing the clamper arm 7 to rotate in a direction indicated by arrows R–R'.

3. Procedures for Disc Playback

The operation of the disc player according to the embodiment will now be described with reference to FIGS. 12A and 12B to FIGS. 17A and 17B.

Figure 12A:
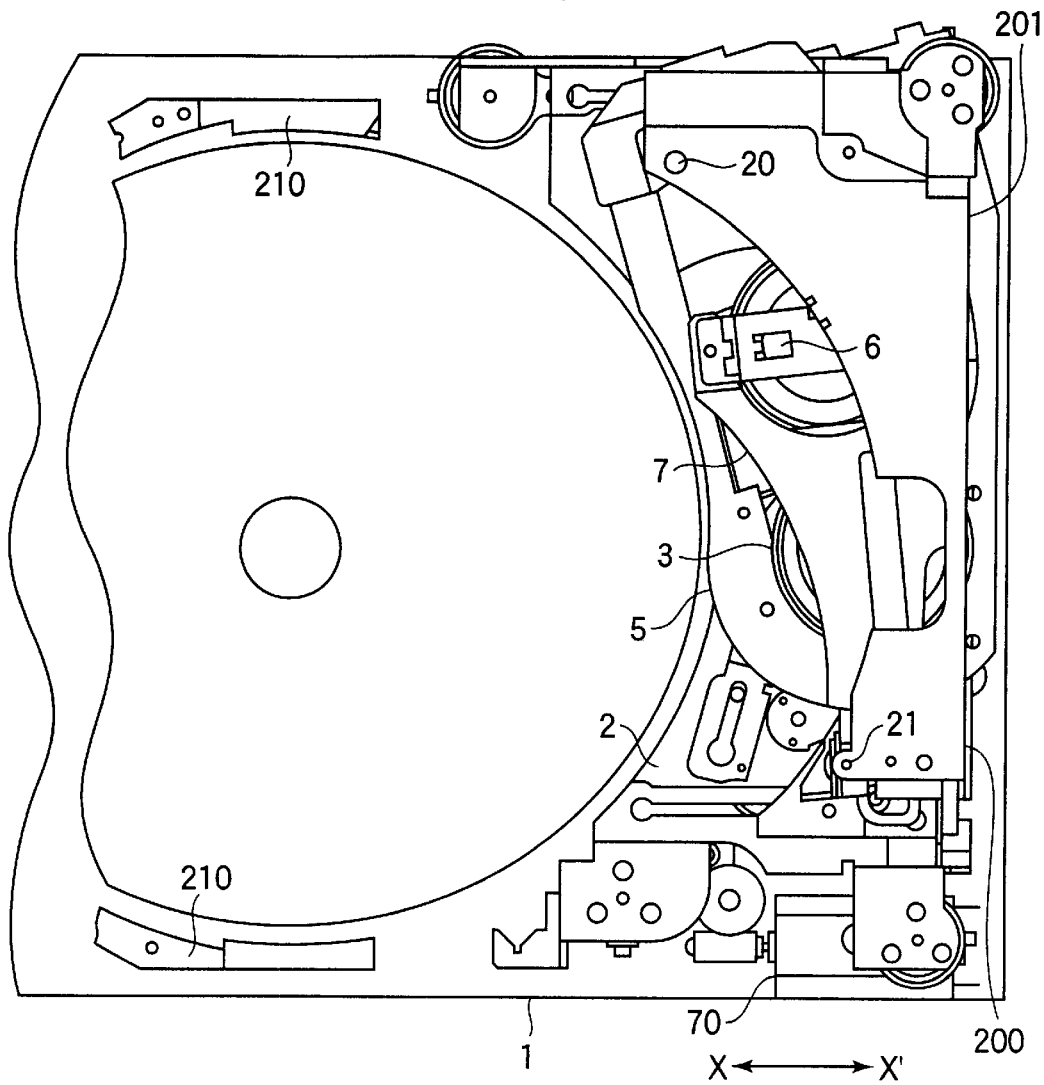
FIGS. 12A and 12B are a schematic plan view and a side view of the disc player according to the embodiment.
Figure 12B:
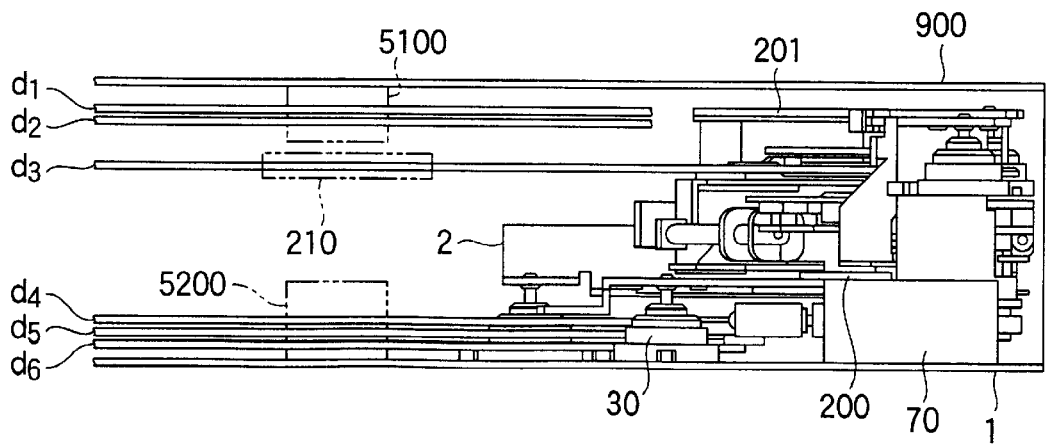
Figure 13A:
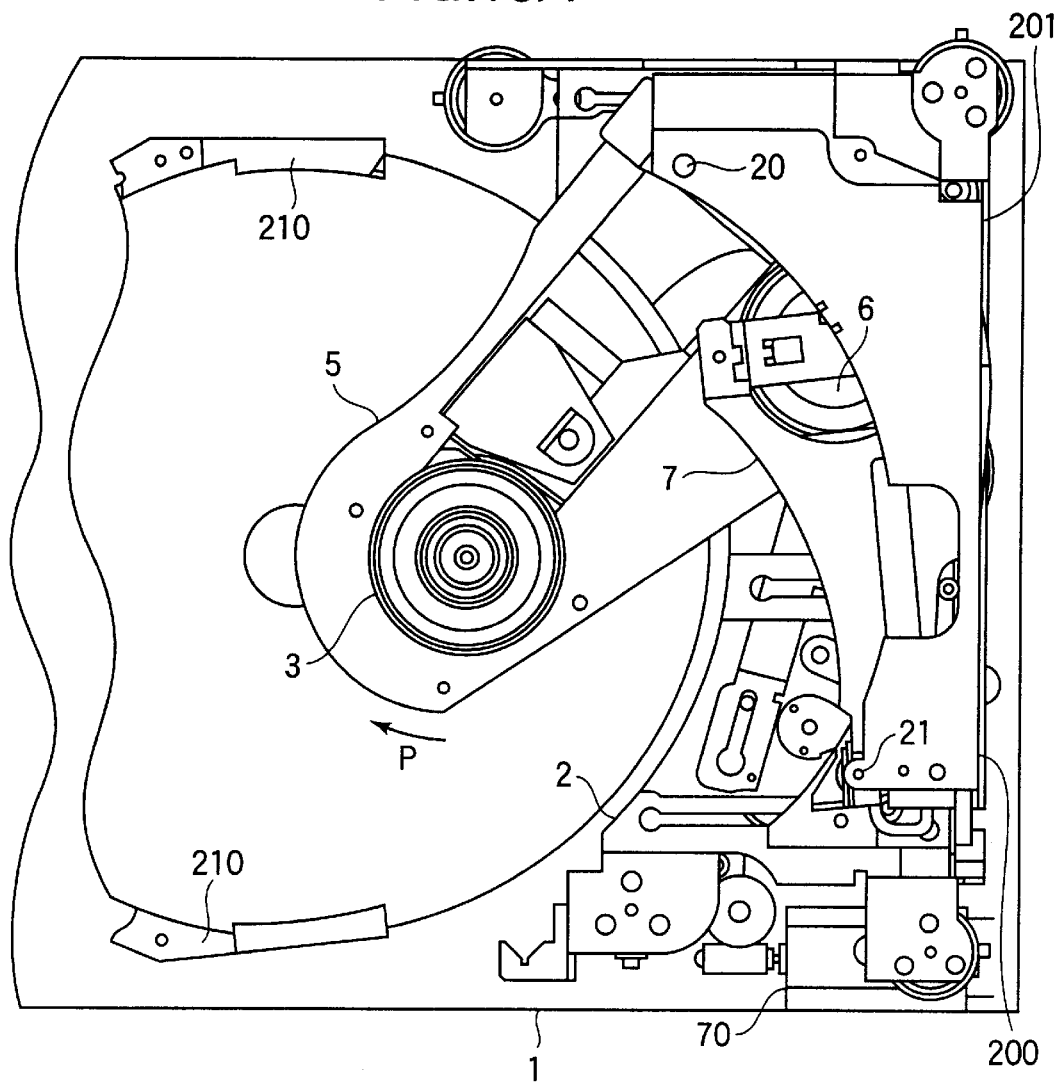
FIGS. 13A and 13B are a schematic plan view and a side view of the disc player according to the embodiment.
Figure 13B:
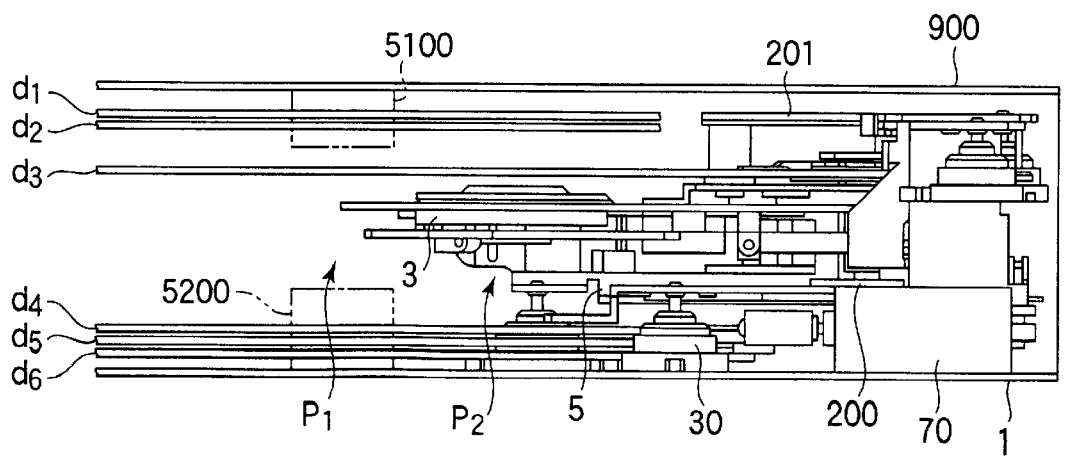

FIGS. 12A and 12B are a plan view and a side view of the disc player when a selected disc $d_3$ (80) is separated from the remaining discs to form a space below the selected disc $d_3$. As shown in FIGS. 12A and 12B, the playback base 5 and the clamper arm 7 are located between the translating plate 200 and the sub-plate 201 on the outside of the discs held by the disc holding/separating mechanism 1100 so as to avoid an interference with the disc change operation. As the cam gears 601 to 603 begin to rotate, the playback base 5 rotates in the direction of the arrow P about the pole 20 to be conveyed into the space below the selected disc $d_3$.

Figure 18A:
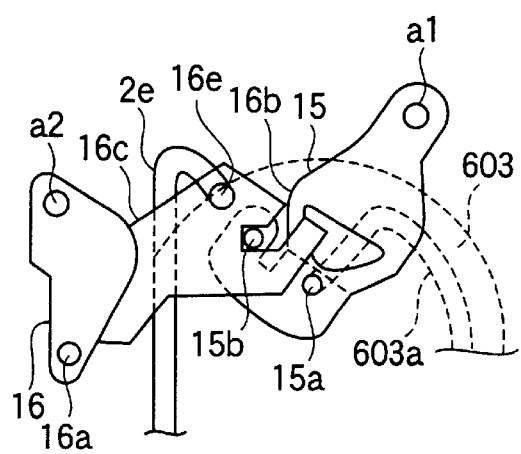
FIGS. 18A to 18C are diagrams showing a turning motion of the playback base of the disc player according to the embodiment.
Figure 18B:
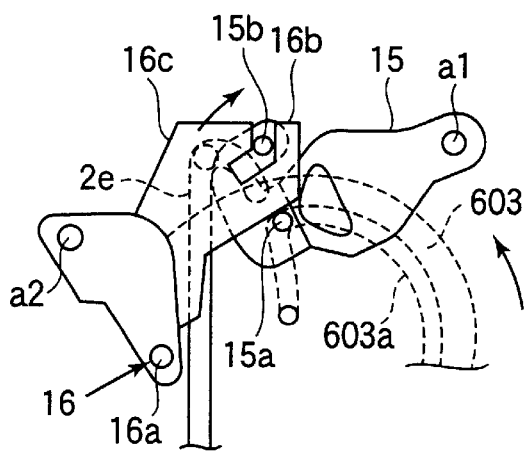
Figure 18C:
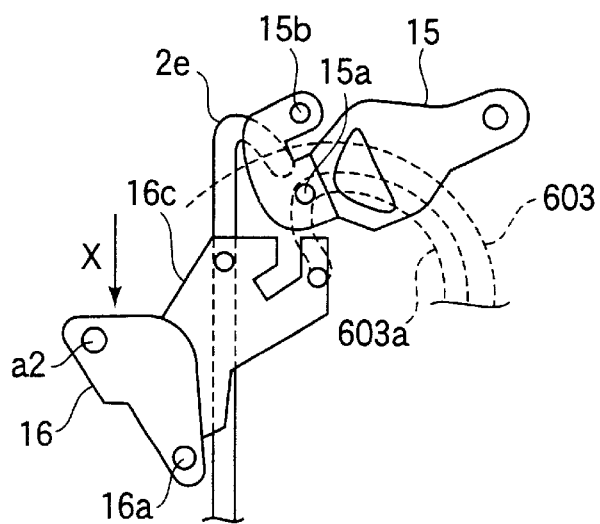

FIGS. 18A to 18C are illustrations of the operation of the linkage when the playback base 5 rotates. As the cam gear 603 rotates, the lever 15 rotates about a point $a_1$, as shown in FIG. 18B, and in response thereto, the drive lever 16 rotates about a point $a_2$. In this manner, the first pin 16a which engages with the opening 5a in the playback base 5 causes the playback base 5 to rotate. During this process, the second pin 16e formed on the back surface of the lever 16 slides along the curvature of the groove 2e.

Figure 14A:
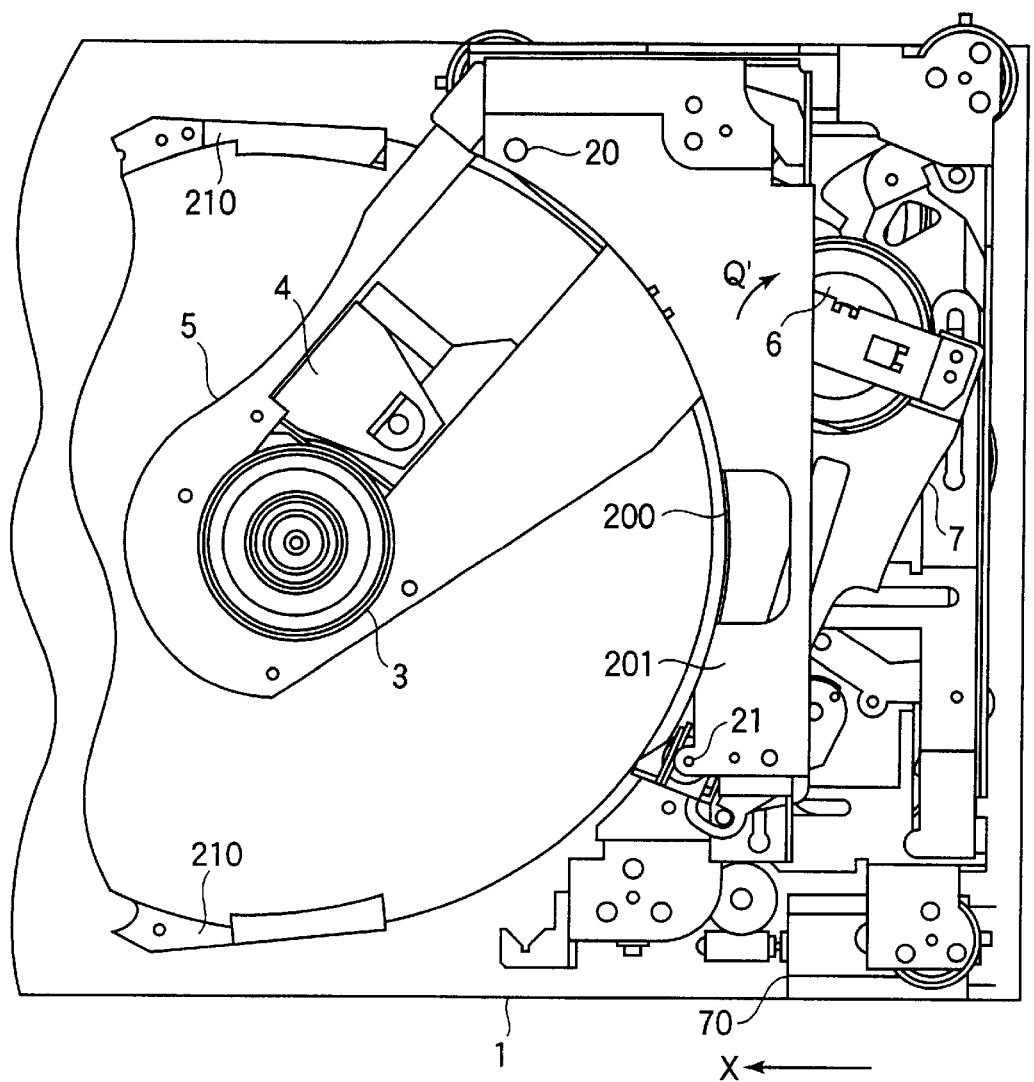
FIGS. 14A and 14B are a schematic plan view and a side view of the disc player according to the embodiment.
Figure 14B:
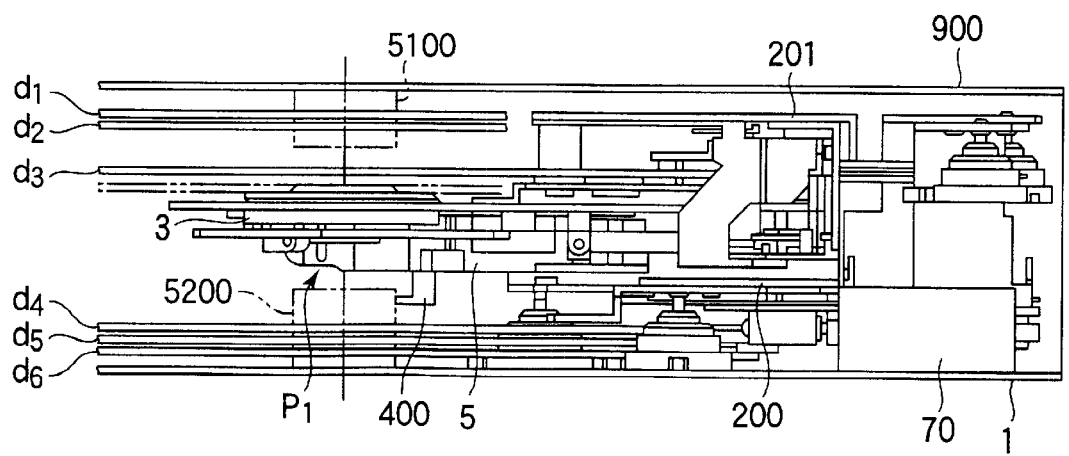

When the playback base 5 rotates and the turntable 3 is conveyed into the first position $P_1$, the translating plate 200 translates in the direction of the arrow X toward the disc holding/separating mechanism 1100, as shown in FIGS. 14A and 14B. At this time, the stop member 400 mounted on the back surface of the playback base 5 abuts against the second guide member 5200, whereby the playback base 5 is positioned so that the rotating shaft of the turntable 3 is aligned with the center of the discs $d_1$ to $d_6$ held by the disc holding/separating mechanism 1100. At this time, the damper arm 7 rotates in the direction of the arrow R' to be retracted from the disc container region, as shown in FIGS. 14A and 14B.

Figure 19A:
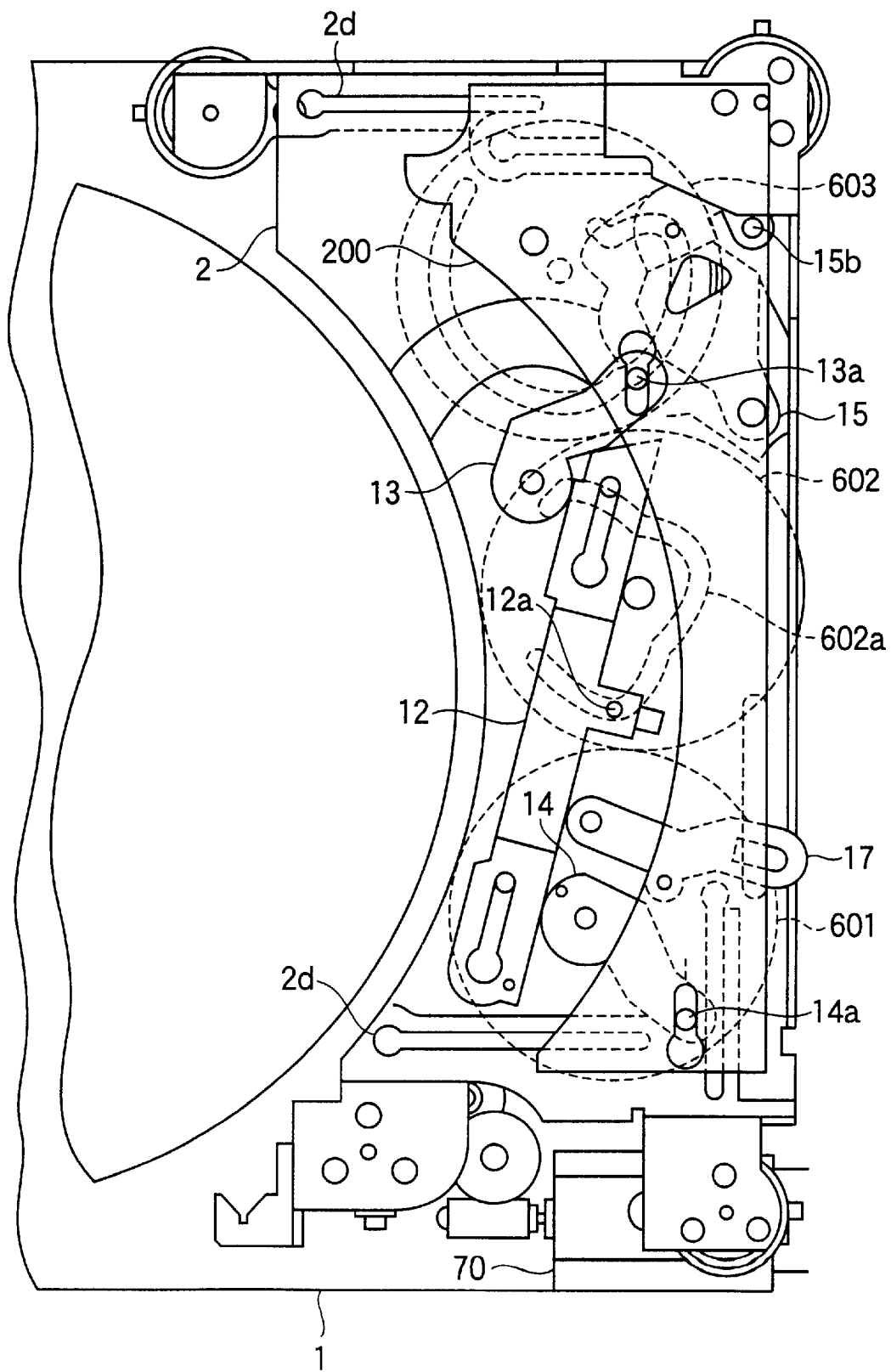
FIGS. 19A and 19B are diagrams showing a translating motion of the translating mechanism of the disc player according to the embodiment.
Figure 19B:
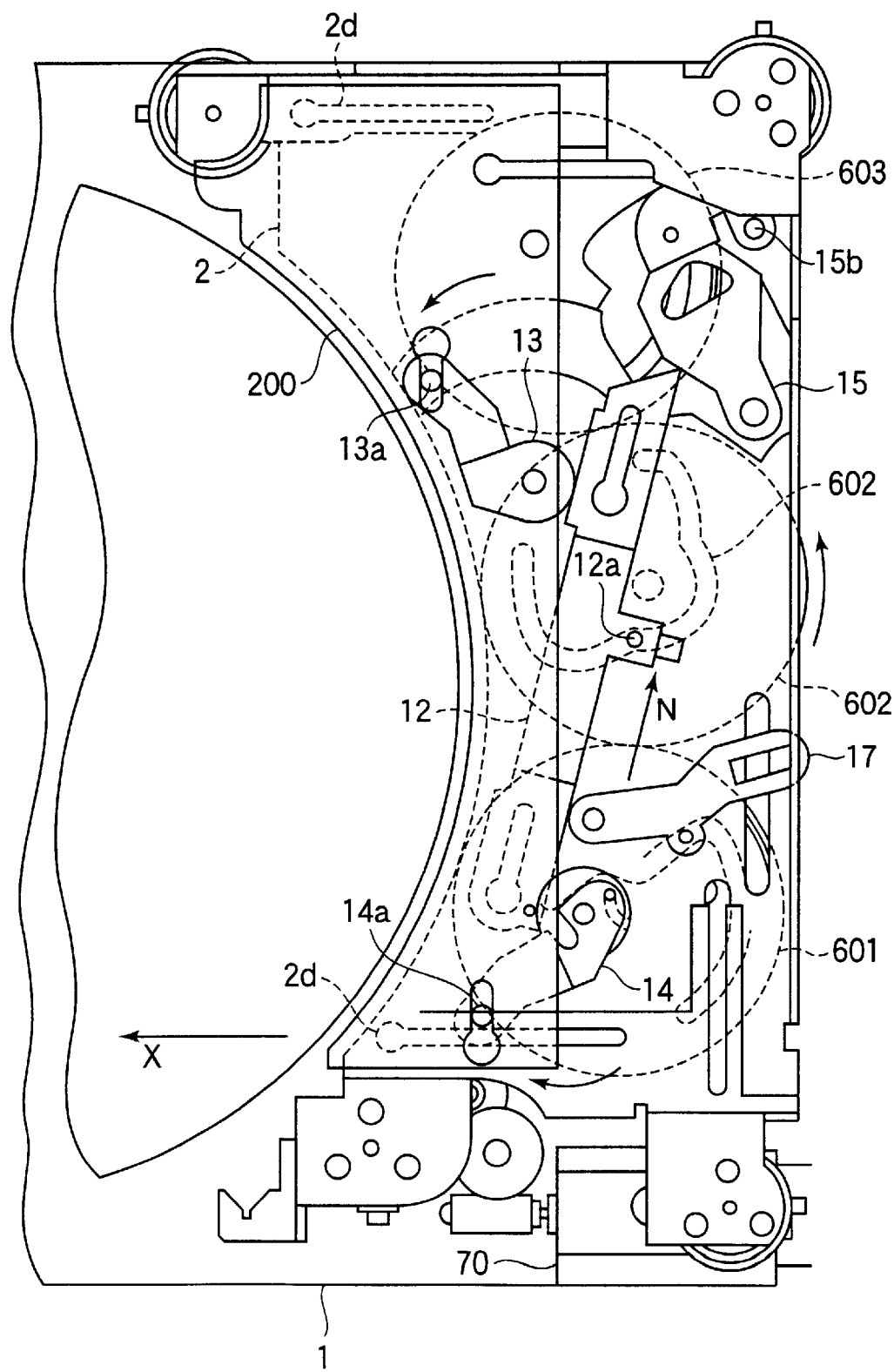

FIGS. 19A and 19B illustrate the operation of the linkage during the translating motion of the translating plate 200. As the cam gear 602 rotates, the cam groove 602a acts such that the rack plate 12 slides in the direction of the arrow N, as shown in FIG. 19B. At this time, the swing levers 13 and 14 which mesh with the opposite ends of the rack plate 12 rotate, causing the translating plate 200 to slide in the direction of the arrow X.

When the translating plate 200 translates in the direction of the arrow X, the pin 15b on the lever 15 moves away from the cam configuration 16b formed in the drive lever 16, as shown in FIG. 18C. The second pin 16e formed on the back surface of the drive lever 16 then slides along the rectilinear portion of the groove 2e, whereby the translating plate 200 translates while maintaining the playback base 5 as positioned at its angular position.

Figure 15A:
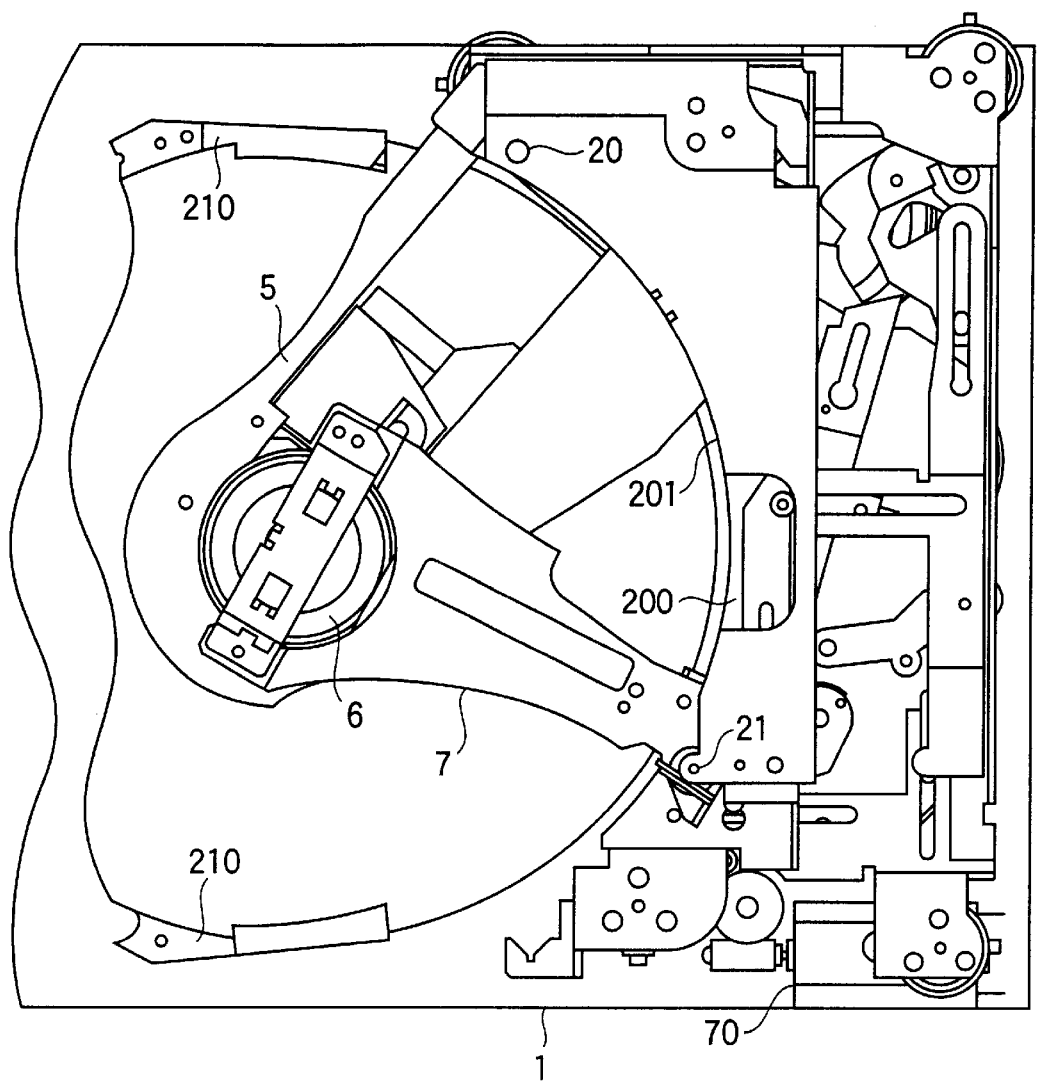
FIGS. 15A and 15B are a schematic plan view and a side view of the disc player according to the embodiment.
Figure 15B:
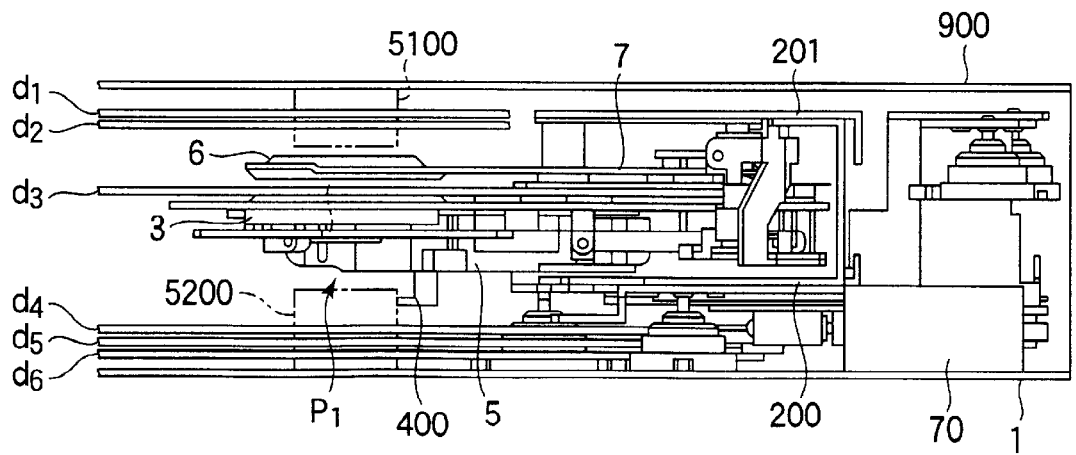

When the selected disc $d_3$ is placed on the turntable 3, the clamper arm 7 is conveyed into the first position $P_1$ above the selected disc $d_3$, as shown in FIGS. 15A and 15B.

Figure 20A:
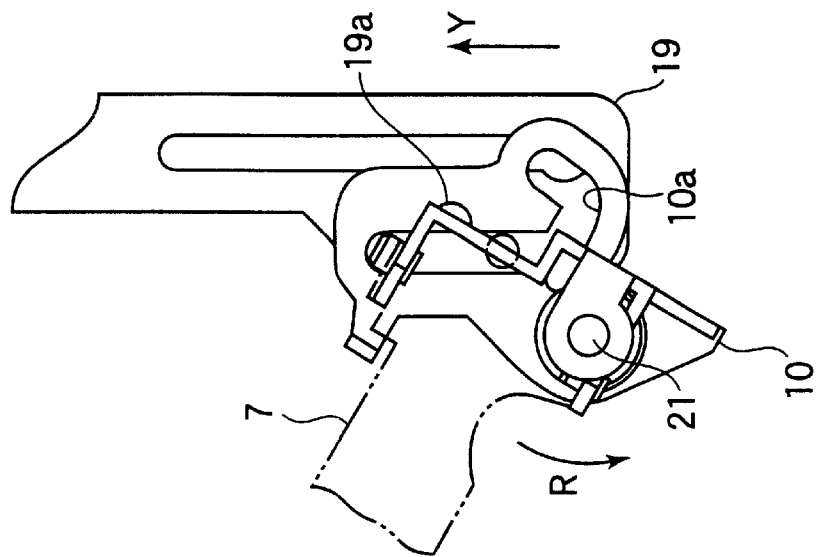
FIGS. 20A to 20C are diagrams showing a turning motion of the clamper arm of the disc player according to the embodiment.
Figure 20B:
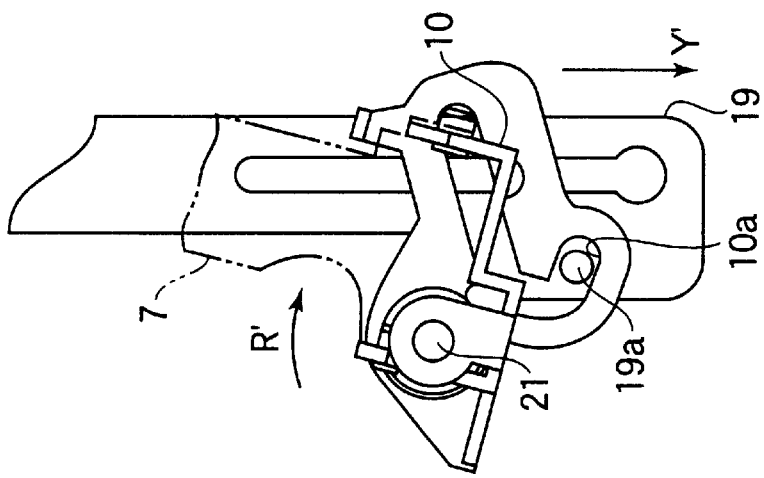
Figure 20C:
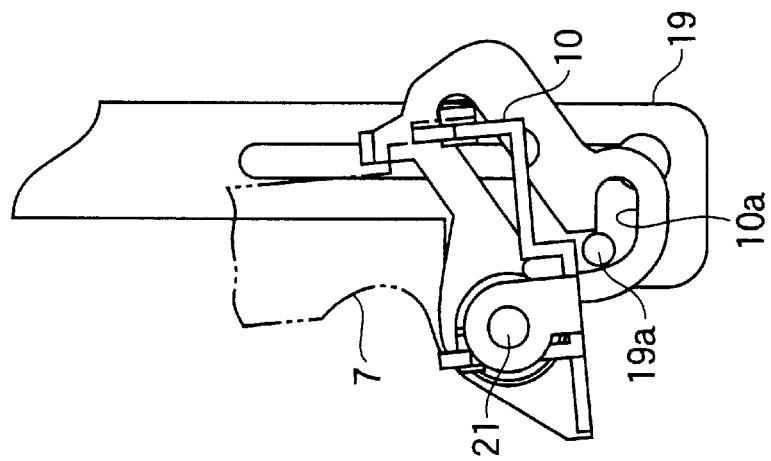
Figure 21A:
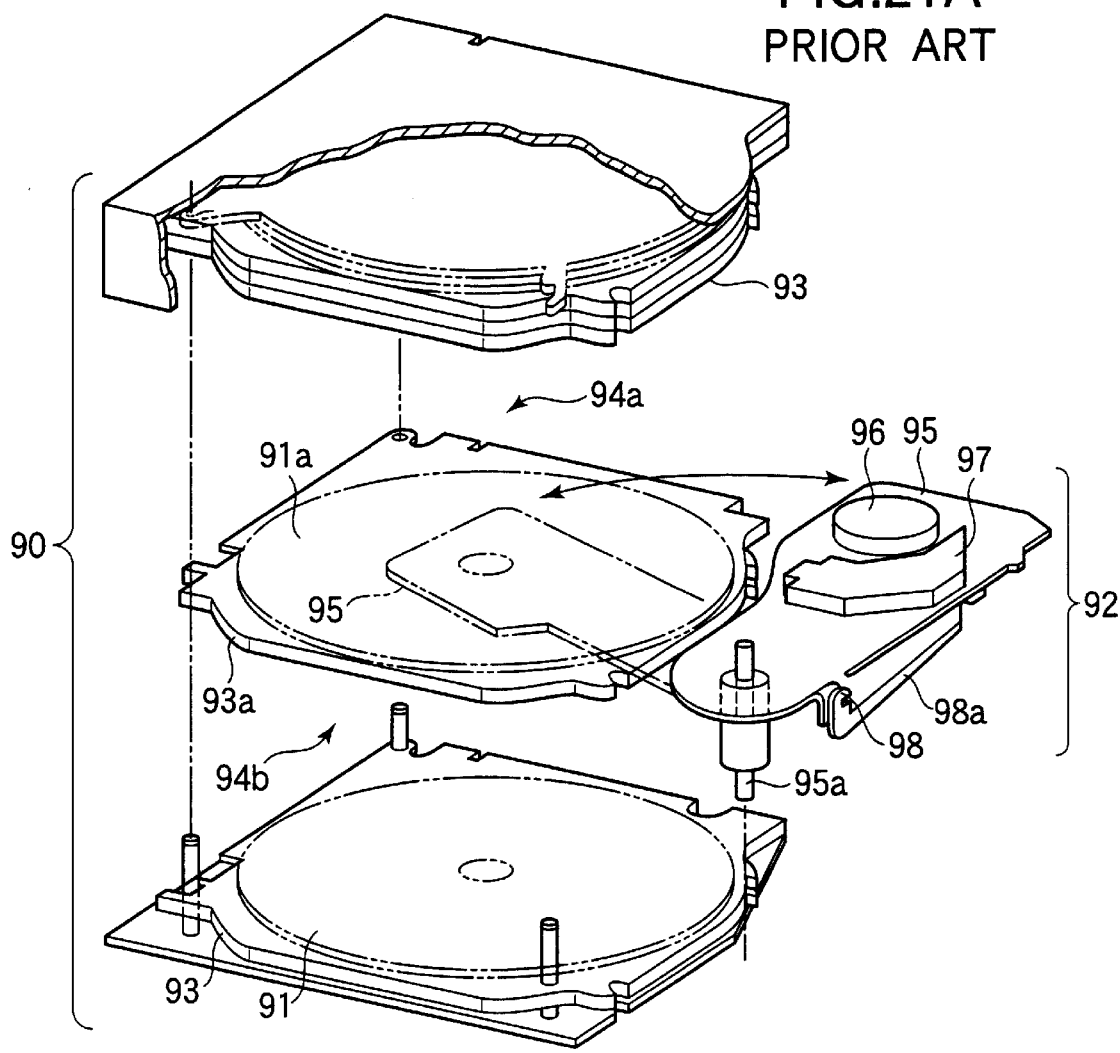
FIGS. 21A and 21B are respectively an exploded perspective view of a disc holding/separating section and a side view of a playback section in the prior art disc player.
Figure 21B:
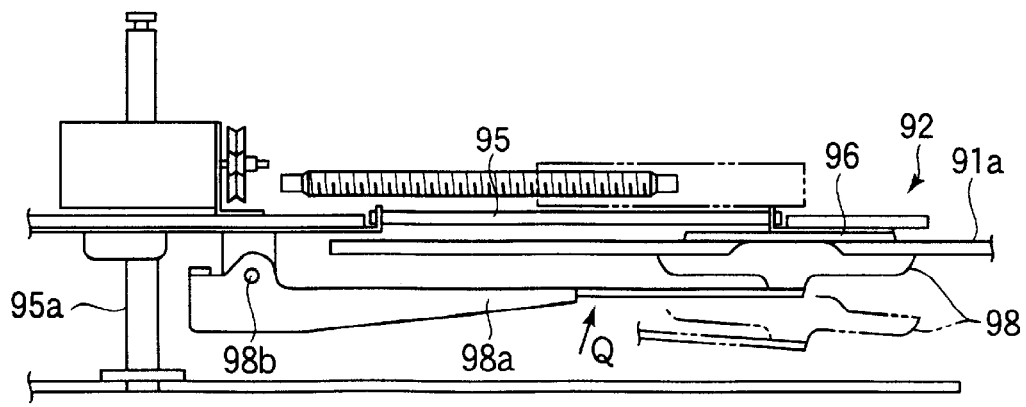

FIGS. 20A to 20C are illustrations of a rotating motion of the clamper arm 7. In FIGS. 20A to 20C, a cam groove 10a is formed in a cam that is integrally formed in the damper arm support member 10, and engages with the drive pin 19a. As the drive pin 19 slides in the direction of the arrows Y–Y', the clamper arm support member 10 rotates in the direction of arrows R–R'. FIG. 20B illustrates that at the same time as the first drive plate 19 translates in the direction of the arrow Y–Y', the clamper arm 7 is retracted in the direction of the arrow R', as shown in FIGS. 14A and 14B. When the first drive plate 19 slides in the direction of the arrow Y, the damper arm support member 10 rotates in the direction of the arrow R, as shown in FIG. 26C, whereby the damper 6 is conveyed to its clamping position as shown in FIGS. 15A and 15B.

The first drive plate 19 is driven in the direction of the arrows Y–Y' by the action of the swing lever 17 which rotates as the cam gear 601 rotates, in turn causing the second drive plate 18 to slide in the direction of the arrows Y–Y'.

Figure 16A:
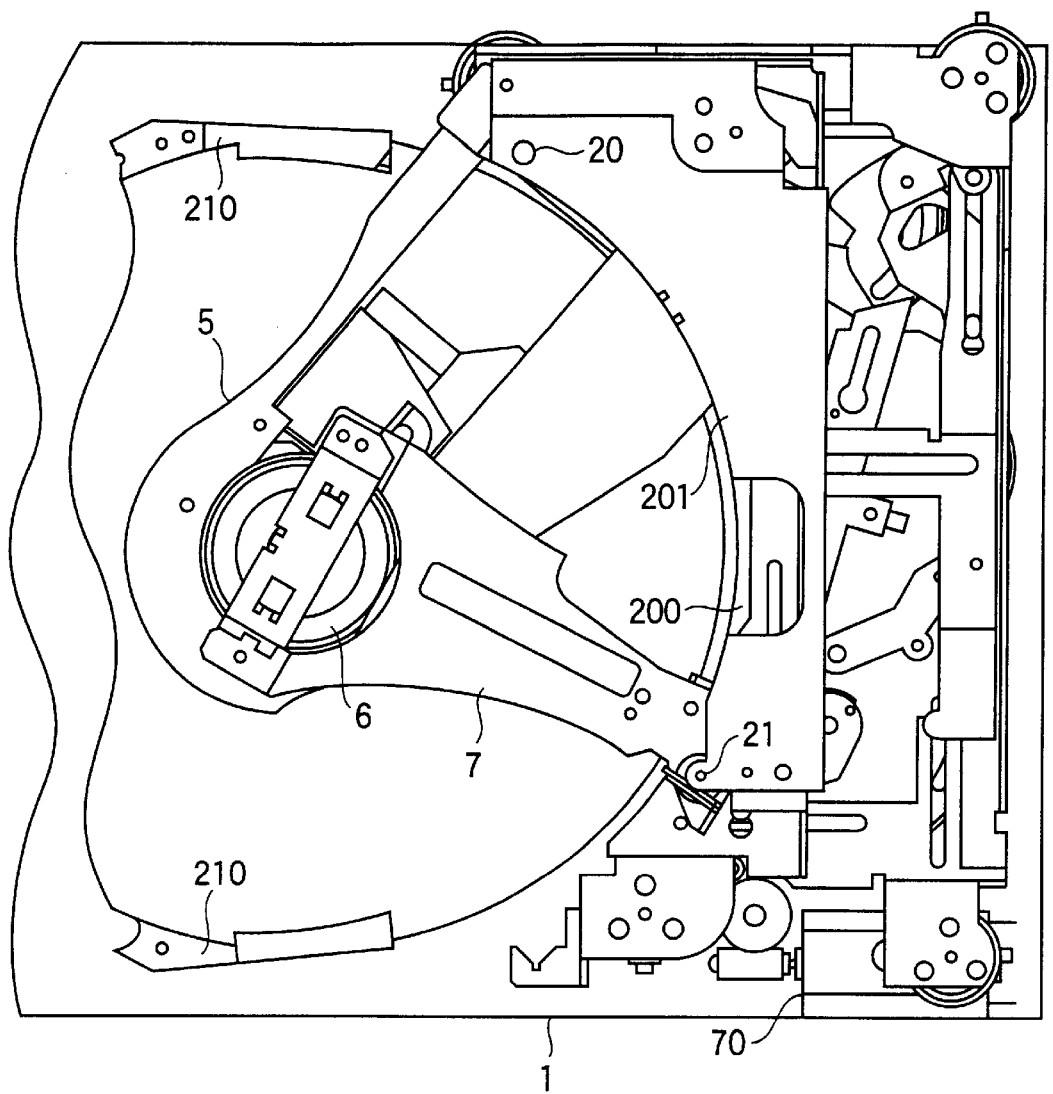
FIGS. 16A and 16B are a schematic plan view and a side view of the disc player according to the embodiment.
Figure 16B:
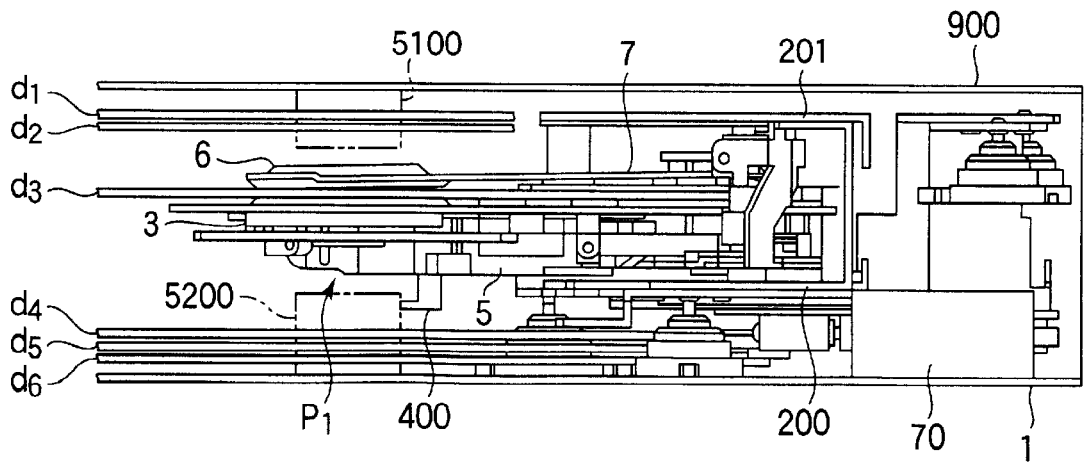
Figure 17A:
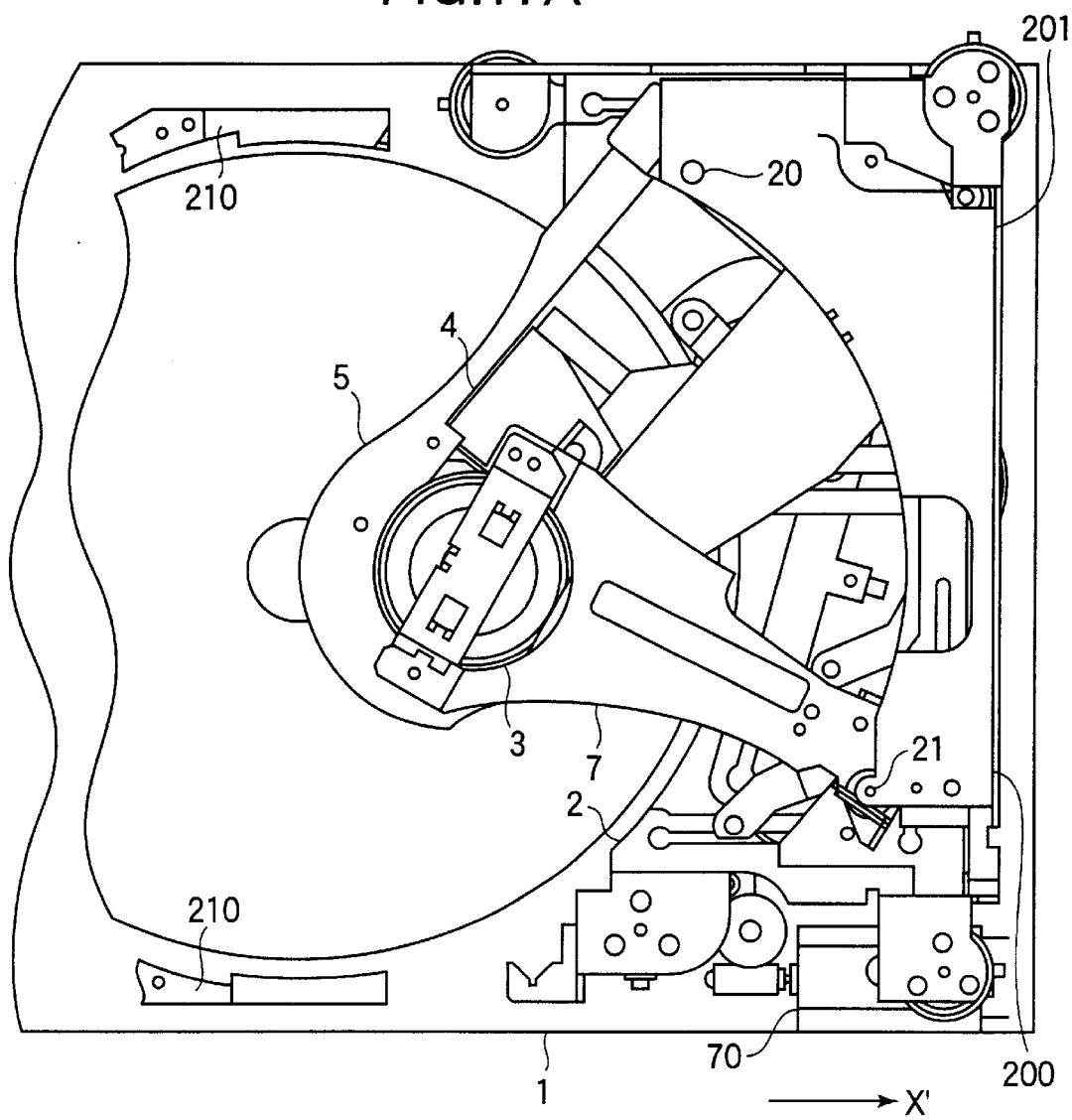
FIGS. 17A and 17B are a schematic plan view and a side view of the disc player according to the embodiment.
Figure 17B:
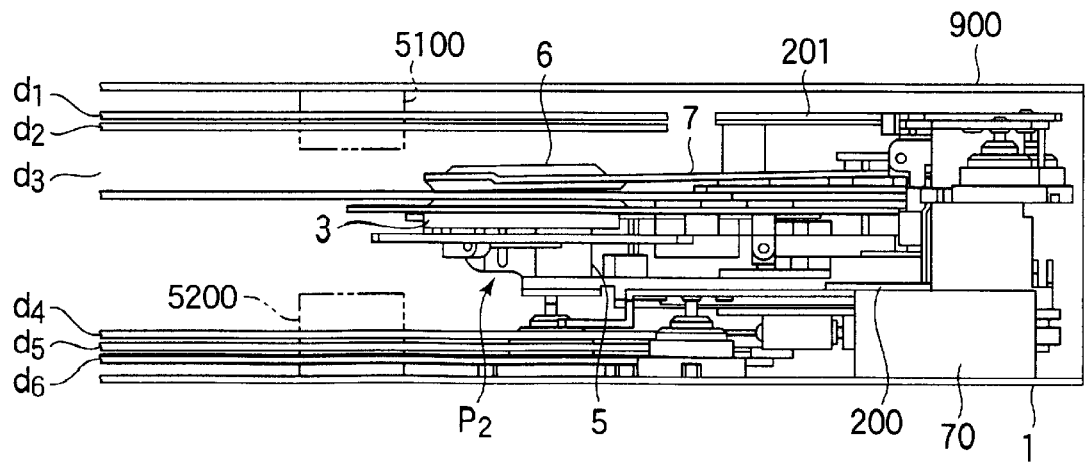

When the clamper 6 is conveyed to its clamping position, disc clamp mechanism (not shown) causes the clamper arm 7 to swing towards the disc surface, whereby the clamper 6 urges the selected disc $d_3$ against the turntable 3, as shown in FIGS. 16A and 16B. When the selected disc is clamped, the translating plate 200 slides in the direction of the arrow X', in a manner as illustrated in FIGS. 17A and 17B. Then, the turntable 3 on which the selected disc $d_3$ is clamped as well as the clamper 6 are retracted from the first position $P_1$ to the second position $P_2$, allowing the disc playback operation to be initiated. At this time, the pawls 67k, 67m and 67n are removed from the pawls 2k, 2m and 2n of the sub-base 2, whereby the sub-base 2 is supported in a floating manner by the vibration absorbing members 30.

The rotation of the playback base 5, the translating motion of the translating plate 200 and the angular movement of the clamper arm 7 are controlled by the configurations of the cam grooves 601a, 602a and 603a formed in the cam gears 601, 602, and 603. The positioning of the turntable 3 by means of the stop member 400 may be controlled by using another mechanism such as a limiter mechanism.

Upon completion of the playback operation and when a next disc is selected, the cam gears 601, 602 and 603 rotate in reverse directions, whereby the operations mentioned above in connection with FIGS. 12A and 12B to FIGS. 17A and 17B take place in a reverse sequence.

In the disc player according to the present invention, discs are held by utilizing guide members 5100, 5200 and 5300 which pass through the internal diameters of the discs and which support a disc passed thereon around the internal diameter thereof, and the playback means which is used to play back a disc is conveyed into the space between opposing surfaces of discs which are passed on the pair of guide members, thus allowing the size of the apparatus to be reduced. In addition, when the turntable 3 and the damper 6 are conveyed into the first position $P_1$ in order to clamp the selected disc $d_3$ and are then conveyed to the second position $P_2$ for purpose of playback, an interference of the turntable 3 and the clamper 6 with the first and the second guide member 5100 and 5200 can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A disc player which is capable of containing a plurality of discs and playing back a disc selected from said plurality of discs, comprising:
   a disc holding/separating mechanism which holds said plurality of discs concentrically and which separates said selected disc from the remaining discs;
   a turntable;
   a pickup which reads out data recorded on said selected disc which is placed on said turntable;
   a playback base which supports said turntable and which moves toward and away from said disc holding/separating mechanism;
   a clamper which secures said selected disc to said turntable;
   a clamper arm which supports said clamper and which moves toward and away from said disc holding/separating mechanism;
   a translating mechanism which supports said playback base and said damper arm and which moves toward and away from said disc holding/separating mechanism; and
   a control mechanism which controls motions of said playback base, said damper arm and said translating mechanism in such a way that, when said selected disc is put on said turntable by said disc holding/separating mechanism, said turntable is placed at a first position, which is located on a central axis of said plurality of discs held by said disc holding/separating mechanism, and when said pickup reads out data from said selected disc, said turntable is placed at a second position, which is located at a predetermined distance from said first position.

2. The disc player according to claim 1, wherein, after said playback base moves toward said disc holding/separating mechanism to place said turntable at said second position, said translating mechanism moves toward said disc holding/separating mechanism to place said turntable at said first position.

3. The disc player according to claim 2, further comprising a stop member which is provided on said playback base and which comes into contact with said disc holding/separating mechanism when said translating mechanism moves toward said disc holding/separating mechanism, wherein said turntable is located at said first position when said stop member comes into contact with said disc holding/separating mechanism.

4. The disc player according to claim 2, wherein, when said translating mechanism moves toward said disc holding/separating mechanism to move said turntable from said second position to said first position, said clamper arm moves away from said disc holding/separating mechanism.

5. The disc player according to claim 4, wherein, after said turntable is located at said first position, said clamper arm moves toward said disc holding/separating mechanism and said damper secures said selected disc to said turntable.

6. The disc player according to claim 5, wherein, after said damper secures said selected disc to said turntable, said translating mechanism moves away from said disc holding/separating mechanism to move said turntable from said first position to said second position.

7. The disc player according to claim 1, wherein said playback base is rotatably mounted on said translating mechanism.

8. The disc player according to claim 1, wherein said damper arm is rotatably mounted on said translating mechanism.

9. A method of controlling a disc player comprising the steps of:
   separating a disc selected from a plurality of discs which are concentrically held by a disc holding/separating mechanism;
   moving a playback base for supporting a turntable toward said disc holding/separating mechanism to place said turntable at a second position, which is located at a predetermined distance from a central axis of said plurality of discs held by said disc holding/separating mechanism;
   moving a translating mechanism toward said disc holding/separating mechanism to place said turntable at a first position, which is located on said central axis of said plurality of discs held by said disc holding/separating mechanism, said translating mechanism supporting said playback base and a clamper arm together with a clamper;
   putting said selected disc on said turntable;
   moving said damper arm toward said disc holding/separating mechanism;
   securing said selected disc to said turntable by said clamper;
   moving said translating mechanism away from said disc holding/separating mechanism to move said turntable from said first position to said second position; and
   playing back said selected disc at said second position.

10. The method according to claim 9, further comprising the steps of:
    moving said translating mechanism toward said disc holding/separating mechanism to move said turntable from said second position to said first position;
    raising said damper from said selected disc which is placed on said turntable;
    moving said damper arm away from said disc holding/separating mechanism to move said damper to an outside of said plurality of discs held by said disc holding/separating mechanism;
    holding said selected disc by said disc holding/separating mechanism;
    moving said translating mechanism away from said disc holding/separating mechanism to move said turntable from said first position to said second position; and
    moving said playback base away from said disc holding/separating mechanism to move said turntable to the outside of said plurality of discs held by said disc holding/separating mechanism.

* * * * *